United States Patent
Fierro et al.

(10) Patent No.: US 6,447,953 B1
(45) Date of Patent: Sep. 10, 2002

(54) NICKEL HYDROXIDE POSITIVE ELECTRODE MATERIAL EXHIBITING IMPROVED CONDUCTIVITY AND ENGINEERED ACTIVATION ENERGY

(75) Inventors: Cristian Fierro, Northville; Michael A. Fetcenko, Rochester Hills; Kwo Young, Troy; Stanford R. Ovshinsky, Bloomfield Hills; Beth Sommers, Waterford; Craig Harrison, Royal Oak, all of MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/686,567

(22) Filed: Oct. 11, 2000

Related U.S. Application Data

(62) Division of application No. 09/135,477, filed on Aug. 17, 1998, now Pat. No. 6,228,535.

(51) Int. Cl.$^7$ ............................................... H01M 4/32
(52) U.S. Cl. .................... 429/223; 429/218.1; 423/594; 423/593; 423/592
(58) Field of Search .................................. 429/223, 229, 429/231.6, 218.1; 423/594, 596, 593, 592

(56) References Cited

U.S. PATENT DOCUMENTS

| 5,788,943 A | * | 8/1998 | Aladjov ....................... 429/223 |
| 6,129,902 A | | 10/2000 | Sakamoto et al. |

* cited by examiner

Primary Examiner—Laura Weiner
(74) Attorney, Agent, or Firm—Dean B. Watson; Marvin S. Siskind

(57) ABSTRACT

High capacity, long cycle life positive electrode modified nickel hydroxide material for use in an alkaline rechargeable electrochemical cell at least one modifier and has modified activation energy, chemical potential and electrical conductivity. Particle size, particle size distribution, electrical conductivity have been controlled by introducing modifier elements throughout the bulk of the active material and by controlling process parameters.

19 Claims, 12 Drawing Sheets

100μ

FIG-7  SEMICONDUCTOR BEHAVIOR IN Ni(OH)₂

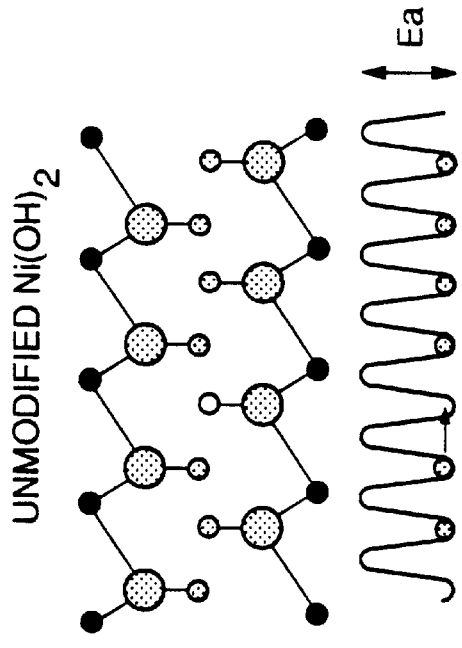

UNMODIFIED Ni(OH)$_2$ $E_a$

1. Very few free holes are generated by defects.
2. Conduction is produced by proton hopping between adjacent sites (tunneling effect in quantum mechnics).
3. The hopping probability (conductivity) is proportional to $\text{Exp}(-E_a/kT)$.

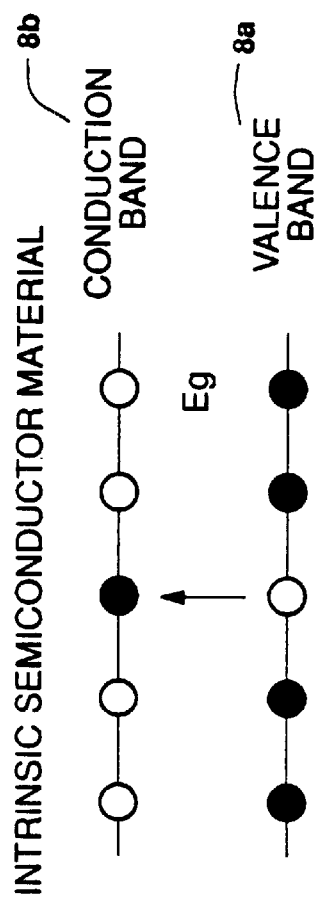

INTRINSIC SEMICONDUCTOR MATERIAL

CONDUCTION BAND — 8b
VALENCE BAND — 8a
$E_g$

1. Very few free charge carriers (electrons, holes) are thermally excited. The number of carriers is proportional to $\text{Exp}(E_{g_2}/kT)$.
2. Once excited, the carrier moves freely between collisions.
3. The conductivity is proportional to density of carriers times the mobility.

FIG - 8B

SEMICONDUCTOR BEHAVIOR IN DOPED AND ALLOYED Ni(OH)$_2$

IN "ALLOYED" Ni(OH)$_2$

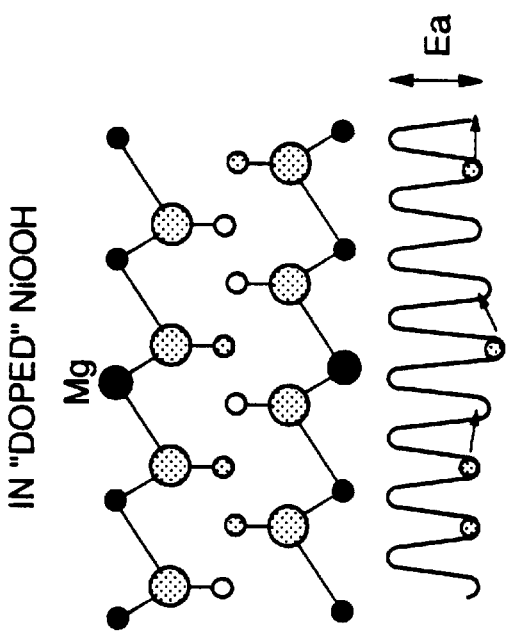

1. The average activation energy can be engineered, as can the conductivity.

FIG - 8A

SEMICONDUCTOR BEHAVIOR IN DOPED AND ALLOYED Ni(OH)$_2$

IN "DOPED" NiOOH

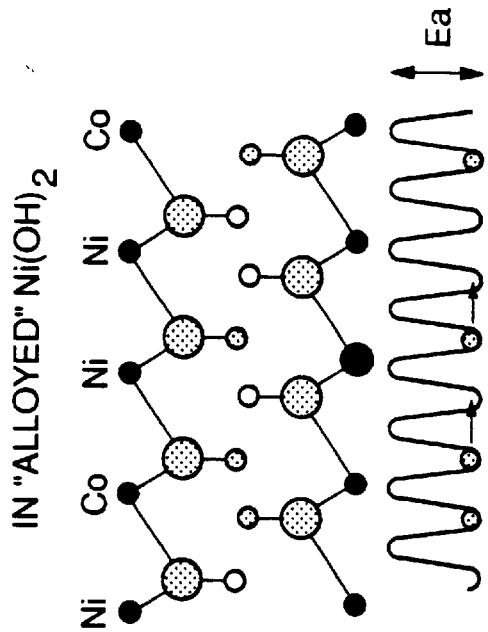

1. The chemical potential and activation energy at specific sites are altered. This "doping" generates a spectrum of conductivity.

2. The neighboring Ni will be pushed to 3+ oxidation state if a mono-valent dopant is used. The overall metal utilization might not change.

SEMICONDUCTOR BEHAVIOR IN Ni(OH)$_2$

IN HIGHER OXIDATION STATE OF Ni

1. Few protons available for electrical transport.

SEMICONDUCTOR BEHAVIOR IN Ni(OH)$_2$

IN PURE β-NiOOH

1. Many holes and protons available for electrical conduction.

Ea: Energy needed for proton to hop into neighbouring vacancy
Eb: Energy needed for proton to hop through the GB

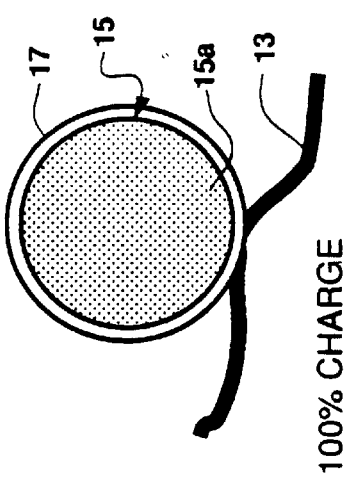
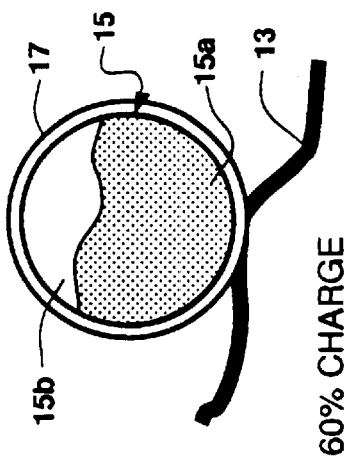
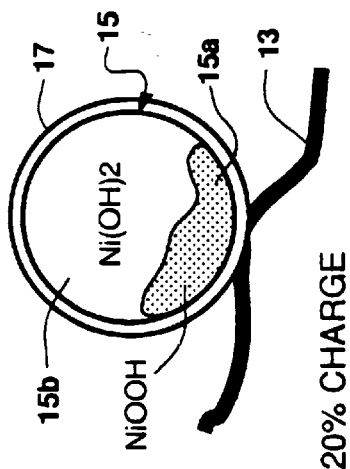
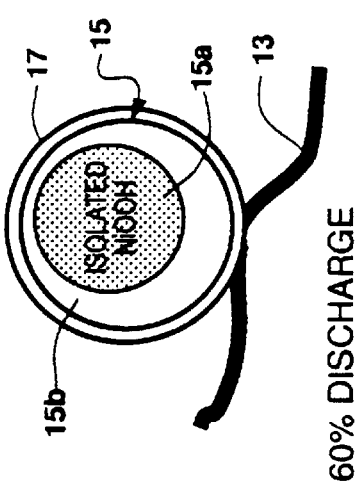
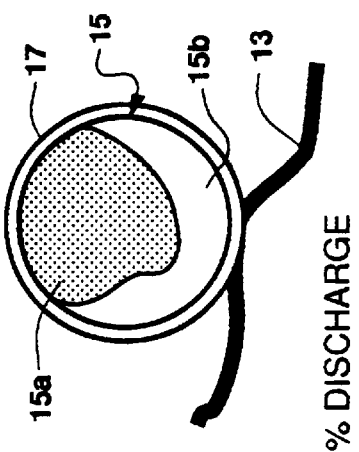
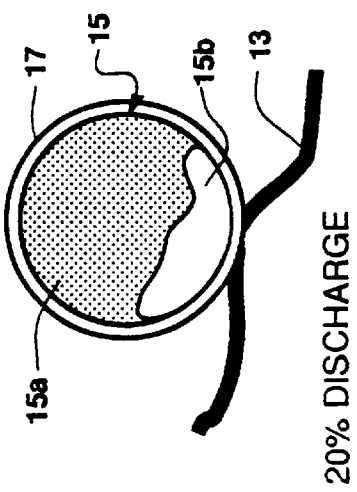

UNIFORM MATERIAL
140% CHARGE (MAGNIFIED)

REGION 12E OF FIG. 12B

DISORDERED MATERIAL
140% CHARGE

UNIFORM MATERIAL
100% CHARGE

DISORDERED MATERIAL
100% CHARGE

NICKEL HYDROXIDE POSITIVE ELECTRODE MATERIAL EXHIBITING IMPROVED CONDUCTIVITY AND ENGINEERED ACTIVATION ENERGY

REFERENCE TO RELATED APPLICATION

The present invention is a divisional of co-pending U.S. patent application: Ser. No. 09/135,477, entitled "Nickel Hydroxide Positive Electrode Material Exhibiting Improved Conductivity and Engineered Activation Energy" by Fierro et al., filed Aug. 17, 1998, now U.S. Pat. No. 6,228,535 the disclosure of which is hereby incorporated by reference.

FIELD OF THE INVENTION

The present invention relates generally to optimized nickel hydroxide positive electrode materials, a process for fabricating such materials, positive electrodes fabricated using such materials and nickel metal hydride ("NiMH") batteries incorporating such materials. More specifically, this invention relates to a multi-element nickel hydroxi de positive electrode material characterized by an engineered activation energy and optimized crystallite size. Preferably this is accomplished by the incorporation of modifier elements into the bulk thereof in a single chamber reactor so as to provide a NiMH battery exhibiting multiple electron transfer, improved capacity, high temperature performance, and cycle life.

BACKGROUND OF THE INVENTION

There are m any known types of Ni based rechargeable alkaline cells such as nickel cadmium ("NiCd"), NiMH, nickel hydrogen, nickel zinc, and nickel iron ("NiFe") cells. At one time NiFe and then NiCd batteries were the most widely used. Just as NiFe batteries were displaced by NiCd batteries, NiCd batteries have now been steadily replaced in all applications by NiMH cells. Compared to NiCd cells, NiMH cells made of synthetically engineered materials have superior electrochemical performance parameters, such as specific energy and energy density, and contain no toxic or carcinogenic elements, such as Cd, Pb, and Hg. For purposes of this patent application, the terms "batteries" and "cells" will be used interchangeably when referring to one cell, although the term "battery" can also refer to a plurality of electrically interconnected cells.

While the present discussion focuses on NiMH batteries, it should be understood that the modified nickel hydroxide materials of the present invention can be used in all types of batteries using nickel hydroxide based positive electrode materials. The term "utilization" will be employed in this disclosure to describe the instant,invention in the manner well accepted by those ordinarily skilled in the electrochemical art. As used herein "utilization" will refer to the percentage of the electrons of the nickel hydroxide positive electrode electrochemically transferred during the charge/ discharge cycling of the electrode relative to the total number of nickel atoms present in the nickel hydroxide material.

In general, NiMH cells employ a negative electrode made of hydrogen storage alloy that is capable of the reversible electrochemical storage of hydrogen. NiMH cells also employ a positive electrode made from nickel hydroxide active material. The negative and positive electrodes are spaced apart in the alkaline electrolyte. Upon application of an electrical potential across a NiMH cell, water is dissociated into one hydroxyl ion and one hydrogen ion at the surface of the negative electrode. The hydrogen ion combines with one electron and diffuses into the bulk of the hydrogen storage alloy. This reaction is reversible. Upon discharge, the stored hydrogen is released to form a water molecule and release an electron.

The development of commercially viable NiMH batteries began in the 1980s by improving the negative electrode materials by making them "disordered" as taught by Ovshinsky, et al in U.S. Pat. No. 4,623,597. Such disordered negative electrode materials represented a total departure from other teachings of the period that urged the formation of homogeneous and single phase negative electrodes. (For a more detailed discussion, see U.S. Pat. Nos. 5,096,667; 5,104,617; 5,238,756; 5,277,999; 5,407,761 and 5,536,591 and the discussion contained therein. The disclosure of these patents are specifically incorporated herein by reference.)

The use of disordered negative electrode metal hydride materials significantly increases the reversible hydrogen storage characteristics required for efficient and economical battery applications, and results in the commercial production of batteries having high density energy storage, efficient reversibility, high electrical efficiency, bulk hydrogen storage without structural change or poisoning, long cycle life, and deep discharge capability.

As discussed in U.S. Pat. No. 5,348,822, nickel hydroxide positive electrode material in its most basic form has a maximum theoretical specific capacity of 289 mAh/g, when one charge/discharge cycles from a $\beta$II phase to a $\beta$III phase and results in one electron transferred per nickel atom. It was recognized in the prior art that greater than one electron transfer could be realized by deviating from the $\beta$II and $\beta$III limitations and cycling between a highly oxidized $\gamma$-phase nickel hydroxide phase and either the $\beta$II phase and/or the $\chi$-phase. However, it was conventionally recognized dogma that such gamma phase nickel hydroxide formation destroyed reversible structural stability and therefore cycle life was unacceptably degraded. A large number of patents and publications in the technical literature disclosed modifications to nickel hydroxide material designed to inhibit and/or prevent the destructive formation of the transition to the $\gamma$-phase.

Attempts to improve nickel hydroxide positive electrode materials began with the addition of elements to compensate for what was perceived as the inherent problems of the material. The use of compositions such as NiCoCd, NiCoZn, NiCoMg, and their analogues are described, for example, in the following patents:

U.S. Pat. No. Re. 34,752, to Oshitani, et al., reissued Oct. 4, 1994, describes a nickel hydroxide active material that contains nickel hydroxide containing 1–10 wt % zinc or 1–3 wt % magnesium to suppress the production of $\gamma$-NiOOH. The invention is directed toward increasing utilization and discharge capacity of the positive electrode. Percent utilization and percent discharge capacity are discussed in the presence of various additives.

Oshitani, et al. describe the lengths that routineers in the art thought it was necessary to go to in order to prevent the presence of substantial amounts of $\gamma$-NiOOH. The patent states:

Further, since the current density increased in accordance with the reduction of the specific surface area, a large amount of higher oxide $\gamma$-NiOOH may be produced, which may cause fatal phenomena such as stepped discharge characteristics and/ or swelling. The swelling due to the production of γ-NiOOH in the nickel electrode is caused by the large change of the density from high density β-NiOOH to low density γ-NiOOH. The inventors have already found that the production of γ-NiOOH can effectively be prevented by addition of a small amount of cadmium in a solid solution into the nickel hydroxide. However, it is desired to achieve the substantially same or more excellent effect by utilizing additive other than the cadmium from the viewpoint of the environmental pollution."

U.S. Pat. No. 5,366,831, to Watada, et al., issued Nov. 22, 1994, describes the addition of a single Group II element (such as Zn, Ba, and Cd) in a solid solution with nickel hydroxide active material. The Group II element is described as preventing the formation of gamma phase nickel hydroxide thereby reducing swelling, and the cobalt is described as reducing the oxygen overvoltage thereby increasing high temperature charging efficiency. Both oxygen overvoltage and charge efficiency are described as increasing with increasing cobalt.

U.S. Pat. No. 5,451,475, to Ohta, et al., issued Sep. 19, 1995, describes the positive nickel hydroxide electrode material as fabricated with at least one of the following elements added to the surface of the particles thereof: cobalt, cobalt hydroxide, cobalt oxide, carbon powder, and at least one powdery compound of Ca, Sr, Ba, Cu, Ag, and Y. The cobalt, cobalt compound, and carbon are described as constituents of a conductive network to improve charging efficiency and conductivity. The powdery compound is described as adsorbed to the surface of the nickel hydroxide active material where it increases the overvoltage, for evolution of oxygen, thereby increasing nickel hydroxide utilization at high temperature. Ohta, et al. claims that increased energy storage in NiMH cells. using the disclosed invention remains constant up to a high number of charge/discharge cycles and capacity does not drop as much at higher temperatures as it does in cells that do not embody the invention.

U.S. Pat. No. 5,455,125 to Matsumoto, et al., issued Oct. 3, 1995, describes a battery having a positive electrode comprising nickel hydroxide pasted on a nickel foam substrate with solid solution regions of Co and salts of Cd, Zn, Ca, Ag, Mn, Sr, V, Ba, Sb, Y, and rare earth elements. The addition of the solid solution regions is intended to control the oxygen overvoltage during charging. The further external addition of "electric conducting agents" such as powdered cobalt, cobalt oxide, nickel, graphite, "and the like," is also described. Energy density is shown as constant at 72 Wh/kg at 20° C. and 56 Wh/kg at 45° C. for embodiments of the invention over the life of the NiMH cell.

U.S. Pat. No. 5,466,543, to Ikoma, et al., issued Nov. 14, 1995, describes batteries having improved nickel hydroxide utilization over a wide temperature range and increased oxygen overvoltage resulting from the incorporation of at least one compound of yttrium, indium, antimony, barium, or beryllium, and at least one compound of cobalt or calcium into the positive electrode. Cobalt hydroxide, calcium oxide, calcium hydroxide, calcium fluoride, calcium peroxide, and calcium silicate are specifically described compounds. Additionally described additives are cobalt, powdery carbon, and nickel. The specification particularly describes AA cells using a positive electrode containing 3 wt % zinc oxide and 3 wt % calcium hydroxide as superior in terms of cycle life (250 cycles at 0° C., 370 cycles at 20° C., and 360 cycles at 40° C.) and discharge capacity (950 mAh at 20° C., 850 mAh at 40° C., and 780 mAh at 50° C.).

U.S. Pat. No. 5, 489,314, to Bodauchi, et al., issued Feb. 6, 1996, describes mixing the nickel hydroxide positive electrode material with a cobalt powder compound followed by an oxidation step to form a beta cobalt oxyhydroxide on the surface of the nickel hydroxide powder.

U.S. Pat. No. 5,506,070, to Mori, et al., issued Apr. 9, 1996, describes nickel hydroxide positive electrode material containing 2–8 wt % zinc mixed with 5–15 wt % cobalt monoxide. The zinc reduces swelling and the cobalt increases utilization. The capacity of the resulting electrode is stated as being "improved up to 600 mAh/cc" without further description.

U.S. 5,571.636, to Ohta, et al., issued Nov. 5, 1996, describes the addition of at least one powdery compound of Ca, Sr, Ba, Cu, Ag, and Y to the surface of nickel hydroxide active positive electrode material. This patent states that these compounds are adsorbed to the surface of the nickel hydroxide active material creating a conductive network that increases the oxygen overvoltage and improves utilization of the active material at high temperatures. Increased capacity in NiMH cells using the '636 invention remains constant up to a large number of cycles and utilization does not drop as much at higher temperatures as it does in cells that do not embody the invention.

In all of the prior art, the basic nickel hydroxide material is treated, most commonly, by the addition of a single element or a compound thereof, usually Co, to increase conductivity and usually one other element or a compound thereof, usually Cd or Zn, to suppress and/or prevent y-phase formation. The mechanisms for the asserted improvements in all the above patents are attributable to the following effects, 1. Improved speed of activation, resistance to poisons, and marginal capacity improvement via increased utilization. At the present time, most commercial nickel metal hydride batteries achieve these effects through the addition of up to 5 wt % cobalt. A noted researcher, Delmas, in the Proceeding of the Symposium on Nickel Hydroxide Electrode 118–133 (1991) observed that much higher capacity could result if as much as 20% trivalent cobalt was used. However, even setting environmental and cost considerations aside, the addition of 20% Co is unstable and thus not applicable to commercially viable systems. Frequently, powdered carbon, powdered cobalt metal, and powdered nickel metal are externally also added to create separate conductive networks and thereby improve utilization. Of course, a major drawback of increasing the amount of such elements that are added is that the amount of active nickel hydroxide electrode material is correspondingly reduced, thereby reducing capacity of the electrode. Further, since Co is very expensive, the addition of Co increases cost.

2. Cycle life is extended by decreasing swelling that is initiated by density changes between the oxidized and reduced states of the nickel hydroxide material. Swelling, in turn, is accelerated by the uncontrolled density changes between βII–βIII phase nickel hydroxide and α-γβ or βII-γ phase nickel hydroxide. Cd and Zn incorporated into the nickel hydroxide effectively reduce the swelling by reducing the difference in density in the charged and discharged material and increasing the mechanical stability of the nickel hydroxide material itself. This is accomplished by promoting oxygen evolution and thereby reducing charge acceptance which prevents the nickel hydroxide material from attaining the highly oxidized state (the γ-phase state). However, by suppressing or at least significantly inhibiting γ-phase state formation, the nickel hydroxide is limited to low utilization. Further, in order to effectively inhibit γ-phase nickel hydroxide, it is necessary to employ a relatively high wt % of the inhibitor element such as Zn, which high percentage results in a greatly reduced amount of active material being present thereby resulting in reduced electrochemical capacity.

3. The aforementioned "safety release" mechanism of oxygen evolution to avoid highly oxidized states (γ-phase) of nickel hydroxide material actually is an impediment to high temperature operation because a significant increase in the rate of oxygen evolution occurs with increasing temperature. The effect of such increased oxygen evolution is a very substantial decrease in utilization and ultimately a reduction in energy storage at higher temperatures in the NiMH battery using these materials. At 55° C., for example, run times of a battery may be reduced by 35–55% compared to the room temperature performance of that same battery.

Elevated operational temperature conditions aside, none of these modifications of the active positive electrode material suggested by the prior art result in more than an incremental improvement in performance and none result in a significant increase in the capacity and/or utilization of the nickel hydroxide material itself, even at room temperature. All prior art batteries are limited to less than one electron transfer per nickel atom. Further, these modifications fail to address the special operational requirements of NiMH batteries, particularly when NiMH batteries are used in electric vehicles, hybrid vehicles,. scooters and other high capacity, high drain rate applications. Because NiMH negative electrodes have been improved and now exhibit an extremely high storage capacity, the nickel hydroxide positive electrode material is essentially the limiting factor in overall battery capacity. This makes improving the overall electrochemical performance of the nickel hydroxide material in all areas more important than in the past. Unfortunately, the elements currently added or previously suggested to be added to the nickel hydroxide material result in insufficient improvements in performance before competing deleterious mechanisms and effects occur. For example, Cd cannot be used in any commercial battery because of the environmental impact thereof, and Co and Zn appear to become most effective only at levels that result in a significant decrease in cell capacity; more specifically, energy per electrode weight.

Accordingly, there remains a long felt need in the art for an improved, higher capacity, higher utilization, high temperature nickel hydroxide positive electrode for a nickel metal hydride battery.

SUMMARY OF THE INVENTION

One object of the present invention is to provide a nickel modified hydroxide positive electrode material having improved capacity, cycle life, rate capability, utilization and high temperature performance.

Another object of the present invention is to provide a nickel hydroxide positive electrode material exhibiting improved electrochemical performance attained by the addition of modifier elements throughout the bulk thereof and at levels that avoid the deleterious effects seen in the prior art while providing modified activation energy, higher electrical conductivity and improved utilization.

These and other objects of the present invention are satisfied by a high capacity, long cycle life positive electrode material for use in an alkaline rechargeable electrochemical cell comprising: nickel hydroxide active material internally containing at least three modifier elements, the nickel hydroxide having a modified hydrogen chemical potential and reduced activation energy providing improved conductivity within and throughout the active material itself and greater use of the available storage sites through improved proton transport.

Other objects of the present invention are satisfied by a high capacity, long cycle life positive electrode material for use in an alkaline rechargeable electrochemical cell comprising: nickel hydroxide; and at least three and preferably four modifiers incorporated throughout the bulk of the nickel hydroxide material. These four modifiers are most preferably Ca, Co, Mg, and Zn.

A still further object of the present invention is to provide doped and alloyed nickel hydroxide active materials having improved charge efficiencies, especially at elevated temperatures. This is accomplished by modifying the oxygen evolution potential (oxygen overvoltage) and improving the resistance of the nickel hydroxide material to unavoidable impurities present in NiMH batteries which can promote premature oxygen evolution.

Yet another object of the instant invention is to provide high electrochemical capacity in sealed, starved electrolyte, NiMH cells. This is accomplished via the use of a mixed β-phase and γ-phase nickel oxyhydroxide material on charge (having in the range of 5–25% or more γ-phase present), which γ phase is introduced in a manner that does not destroy cycle life (as repeatedly disclosed in the prior art). This is accomplished by incorporating the γ-phase during initial battery formation and not allowing the γ-phase to gradually form by "accident" during cycling.

It is to be noted that the term γ-phase nickel oxyhydroxide refers to a highly oxidized state of a base nickel hydroxide material obtained via any of several alternate routes One route is conventional γ-phase NiOOH where the oxidation state of the nickel is higher than 3+ during charging. This may be accomplished by inserting some anions, such as $NO_3^-$ among the water layer separating the adjacent Ni-O planes. For example, the average oxidation number of Ni in $NiOOH—(H_2O)_x(NO_3)_{0.5}$ is 3.5+. Another route of achieving γ-phase NiOOH is an innovation described in this patent, i.e., doping the host $Ni(OH)_2$ with a metal having a lower oxidation number such as $Mg^{2+}$ and $Ca^{2+}$. The doping effect of these cations is identical to that of the anions added via the first route, i.e., to push Ni to a higher oxidation state. For example, the average oxidation number of Ni in $NiMg_{0.5}(OOH)_{1.5}$ is 3.5+.

There are several possible phase changes that occur during the charge/discharge cycling of nickel hydroxide material. The most common one is β(II)/β(III) transformation will provide for a single electron transfer per Ni atom (Commonly, this Ni utilization is further reduced in practice to 0.8–0.9 in starved electrolyte sealed cells.) Then there is a conventional $α$-$Ni(OH)_2$/$γ$-$NiOOH$ transformation which involves moving some anions among the water layer between Ni—OH planes with a large change in the c lattice constant of the unit cell; and more than one electron transfer per Ni atom. The large change in the c lattice constant promotes easy pulveration and inferior cycling performance. This is the main reason that all prior art tried to inhibit the formation of γ-NiOOH to optimize the cycling performance. Of course, the present inventors have shown that gradual unrestrained growth of large pockets of γ-NiOOH can indeed cause detrimental swelling, but that "built in," localized, finely distributed γ-NiOOH in fact provides excellent cycle life. The third possible transformation as taught in this patent application is directly changing from $\beta Ni(OH)_2$ to γ-NiOOH during the charge. process, which includes moving both water molecules and anions in and out of the structure, and contributes an even greater lattice constant change during cycling. The fourth possibility is forming the higher oxidation state of Ni by substituting lower oxidation state cations for some Ni atoms thereby creating a variation in local binding environments. In the last case, there will be no need to move water or any other anions around and the disturbance to the. lattice constant will be small, no greater than the change that occurs during a routine $\beta(II)/\beta(III)$ transformation. Note that these phase transitions, as described above, provide additional hydrogen sites and promote faster proton transport.

A still further object of the present invention is to provide a method by which modifier elements, such as Ca, can be incorporated internally into highly modified nickel hydroxide material. As discussed above. Ca has commonly been added externally to the Ni—Co—Zn nickel hydroxide positive electrode material to improve high temperature performance of the battery. Heretofore, the simultaneous precipitation of Ca has been avoided during nickel hydroxide fabrication because the starting charge metals are incorporated into a metal sulfate solution for reaction with an alkali; such as NaOH. Ca added internally, whether alone or in combination with other γ-phase suppressant elements such as Zn and Ca, to nickel hydroxide has been disclosed by Oshitani, et al as a γ-phase suppressant. Ni—Co—Zn. Ni—Co—Ca, Ni—Co—Mg were all shown to inhibit the formation of γ-phase, with Zn being much more effective than Ca or Mg. In fact, Ni—Co—Zn has become the commercial positive electrode material of choice. Where 3 atomic % Zn can effectively inhibit γ-phase, it is necessary to use upwards of 10 wt % Ca or Mg in order to accomplish this same task. No one has taught, disclosed or suggested that the simultaneous coprecipitation of highly modified compositions which do not inhibit γ-phase formation Ni—Co—Zn—Mg—Ca, would produce the beneficial effect of high utilization, long life, and improved high temperature performance. Since Ca is not soluble in $NiSO_4$, the subject inventors developed a dual reactant feed approach which can add elements such as Ni, Co, Zn, Mg, Cu, Mn via a metal sulfate ("$MeSO_4$") solution. A special feed of Ca reactant, such as $CaNO_3$ or $CaCl_2$, is the vehicle for the simultaneous internal Ca addition. This approach is vastly superior in that Ca is thus placed in intimate proximity on an atomic basis, whereas in conventional high surface area $Ni(OH)_2$ (~10 m²/gram), externally added Ca can never reach all necessary internal atomic locations.

Still another aspect of the present invention is to provide high capacity, long cycle life positive electrode material for use in an alkaline rechargeable electrochemical cell comprising: nickel hydroxide active material containing at least three modifier elements, the modified nickel hydroxide having a modified activation energy and chemical potential providing inherently higher conductivity nickel hydroxide active material. This improved conductivity allows greater utilization of hydrogen storage sites in a β-II/β-III phase transition and/or improved formation and distribution of high capacity γ-phase regions.

Another object of the present invention is to provide high capacity, long cycle life positive electrode material for use in an alkaline rechargeable electrochemical cell comprising: nickel hydroxide particles that are spherical and average 5–20 μm in size, the particles formed of fine crystallites typically averaging 70–150 Å in size. This typical size is significant in that the number of storage sites on the surface of the crystallites approximates the number of storage sites in the bulk, thereby resulting in heretofore unaccessible sites being made available for hydrogen storage. Such small crystallite sizes allow for better diffusion of ions and electrolyte in the bulk of the material.

A final object of the present invention is to provide a method of making a high capacity, long cycle life nickel hydroxide positive electrode for use in an alkaline rechargeable electrochemical cell comprising: combining $MeSO_4$, $MeNO_3$, and/or $MeCl_2$, $NH_4OH$ and NaOH in a single reactor, maintaining the reactor at a constant temperature of 20–100° C., agitating the combination at a rate of 400–1000 rpm, and controlling the pH of the agitating combination at 6–10. This unique, single reactor method permits the incorporation of multi-element modifiers that cannot be incorporated using a $MeSO_4$ feed stream as described in the prior art. This method also permits a previously unattainable uniform distribution of the modifiers in the bulk of the nickel hydroxide matrix, while maintaining excellent tap density, crystallite size, and surface area in a high yield, cost effective, commercially viable single precipitation process reactor.

DESCRIPTION OF THE DRAWINGS

FIG. 7 is a depiction in highly stylistic form illustrating the analogous nature of the positive electrode material and conventional intrinsic semiconductor material;

FIG. 8 is a depiction in highly stylistic form illustrating the differences between the "doped" and "alloyed" positive electrode material of the instant invention;

FIGS. 11A–11F are stylized depictions of spherical particles of nickel hydroxide material without an internal conductive network showing the degree of accessibility of bulk interior regions of the material at various states of charge and discharge.

DETAILED DESCRIPTION OF THE INVENTION

It was not until research into disordered metal hydride negative electrode materials was well established that researchers at Ovonic Battery Company, Inc. ("OBC"), the assignee of the instant invention, turned their attention to the nickel hydroxide positive electrode material. More specifically, researchers did not tackle the problems inherent with state-of-the-art positive electrodes until the negative electrodes had been developed to the point of making NiMH cells positive electrode limited, the negative electrode outperformed the positive. This work began at OBC and is described in U.S. Pat. Nos. 5,344,728; 5,348,822, 5,523,182 and 5,673,423. (The disclosure of these patents are specifically incorporated herein by reference.) These patents describe a portion of OBC's development of improved nickel hydroxide material. In general, these patents focus on increasing the electrode/battery capacity through modification of the positive electrode material in such a manner as to encourage multiple electron transfers per nickel atom and increasing conductivity between the nickel hydroxide crystallites via alternate conductive pathways.

More specifically, U.S. Pat No. 5,344,728 presents a basic tutorial on methods and materials necessary to achieve high capacity positive electrode nickel hydroxide material. In this patent, extremely high capacity, >560 mAh/cc, was achieved via a special multiphase chemical precipitation of NiCo active material having very low impurity levels and extremely high active material loading.

U.S. Pat. No. 5,348,822 describes a significant deviation from prior art nickel hydroxide materials via the deliberate introduction of mixed β and γ phases in multielement nickel hydroxide material. The deliberate introduction of a substantial amount of γ-phase material provided for very high capacity of the positive electrode without sacrificing cycle life. For the first time, it became possible to obtain more than one electron transfer per Ni atom and stable cycle life.

U.S. Pat. No. 5,523,182 describes a novel approach to improve the conductivity and to reduce the oxygen evolution of nickel hydroxide material via the establishment of Co coated nickel hydroxide as opposed to conventional prior art methods of applying external Co, Co compounds such as Co metal, CoO and $Co(OH)_2$, which compounds are dissolved during battery formation and then reprecipitated.

Contrary to the teachings of the prior art, OBC has found that the most significant gains in the electrochemical performance of nickel hydroxide material thus far have come from increasing capacity by encouraging the presence of stable gamma phase material. Because gamma phase nickel hydroxide material is capable of transferring up to two electrons per nickel atom, the presence of gamma phase regions provides positive electrode materials that transfer more than one electron per nickel atom over a long cycle life. Simply stated, this results in increased overall capacity.

Figure 4:
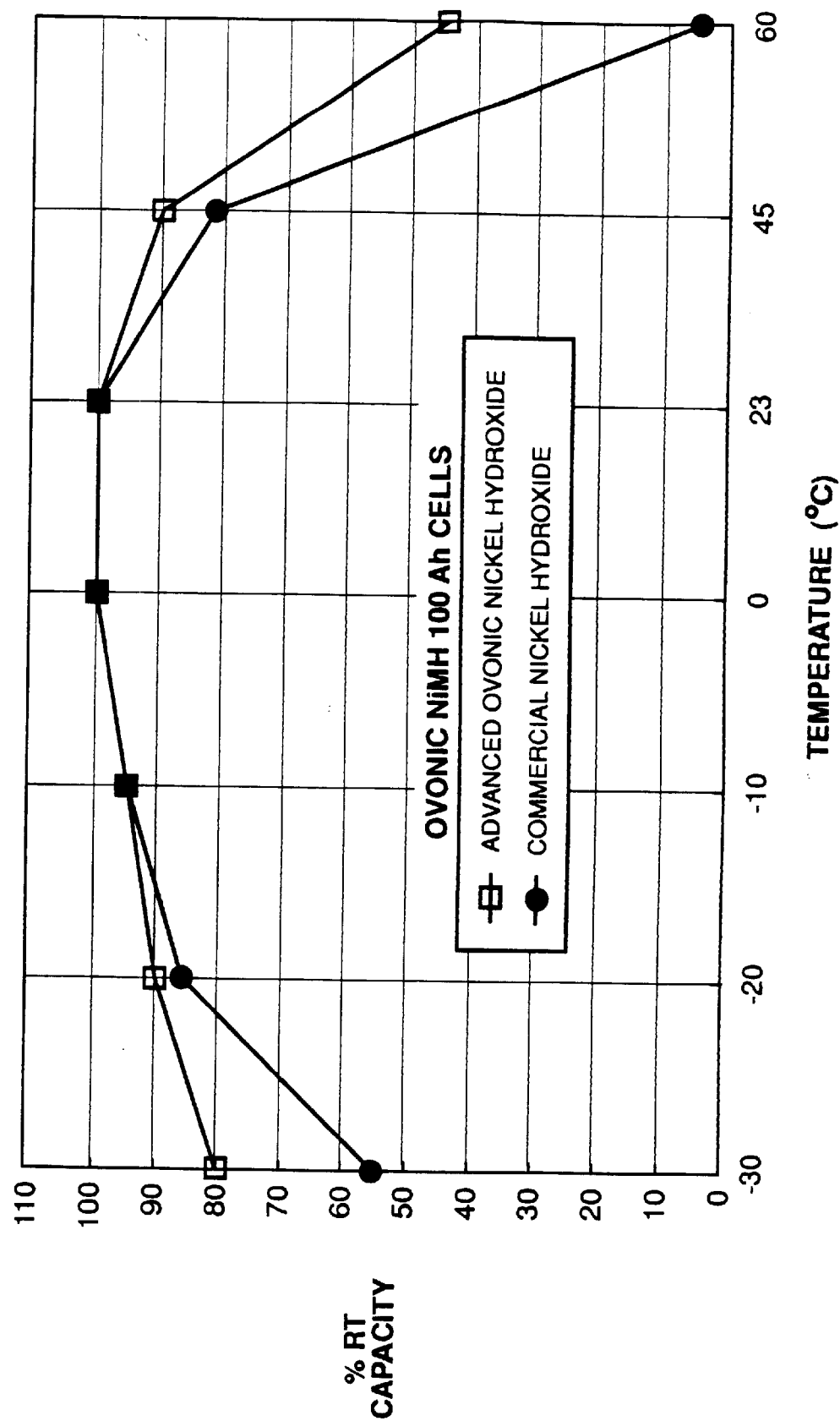
FIG. 4 is a graph showing the temperature-related performance of nickel metal hydride cells made using the modified positive electrode material of the present invention as compared to similar nickel metal hydride cells made with conventional (commercial) nickel hydroxide material, temperature being plotted on the abscissa and percent of room temperature capacity being plotted on the ordinate.
Figure 5:
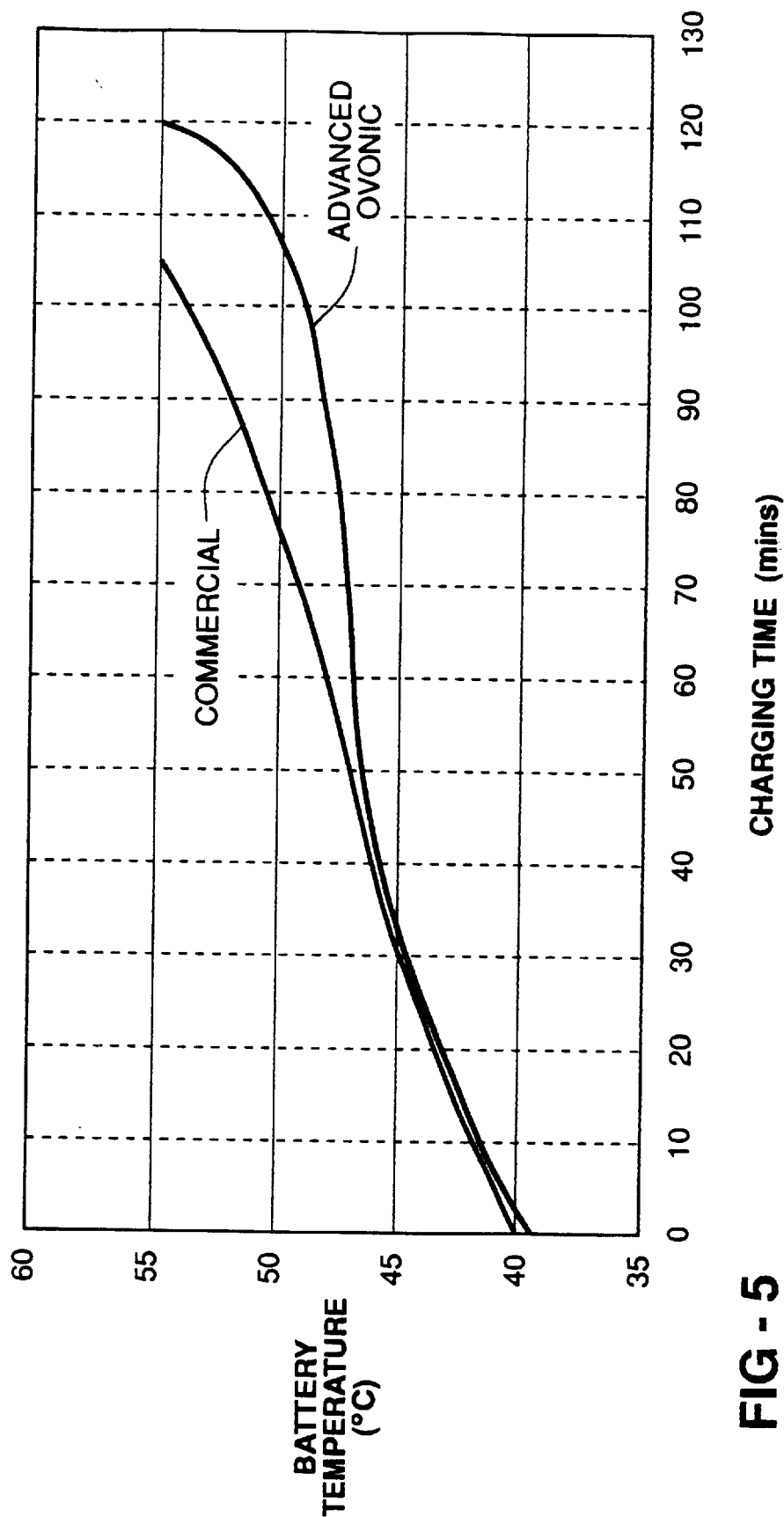
FIG. 5 is a graph showing the high temperature performance of nickel metal hydride cells made using the modified positive electrode material of the present invention as compared to similar cells made with conventional nickel hydroxide material, charging time being plotted on the abscissa and battery temperature being plotted on the ordinate.
Figure 6:
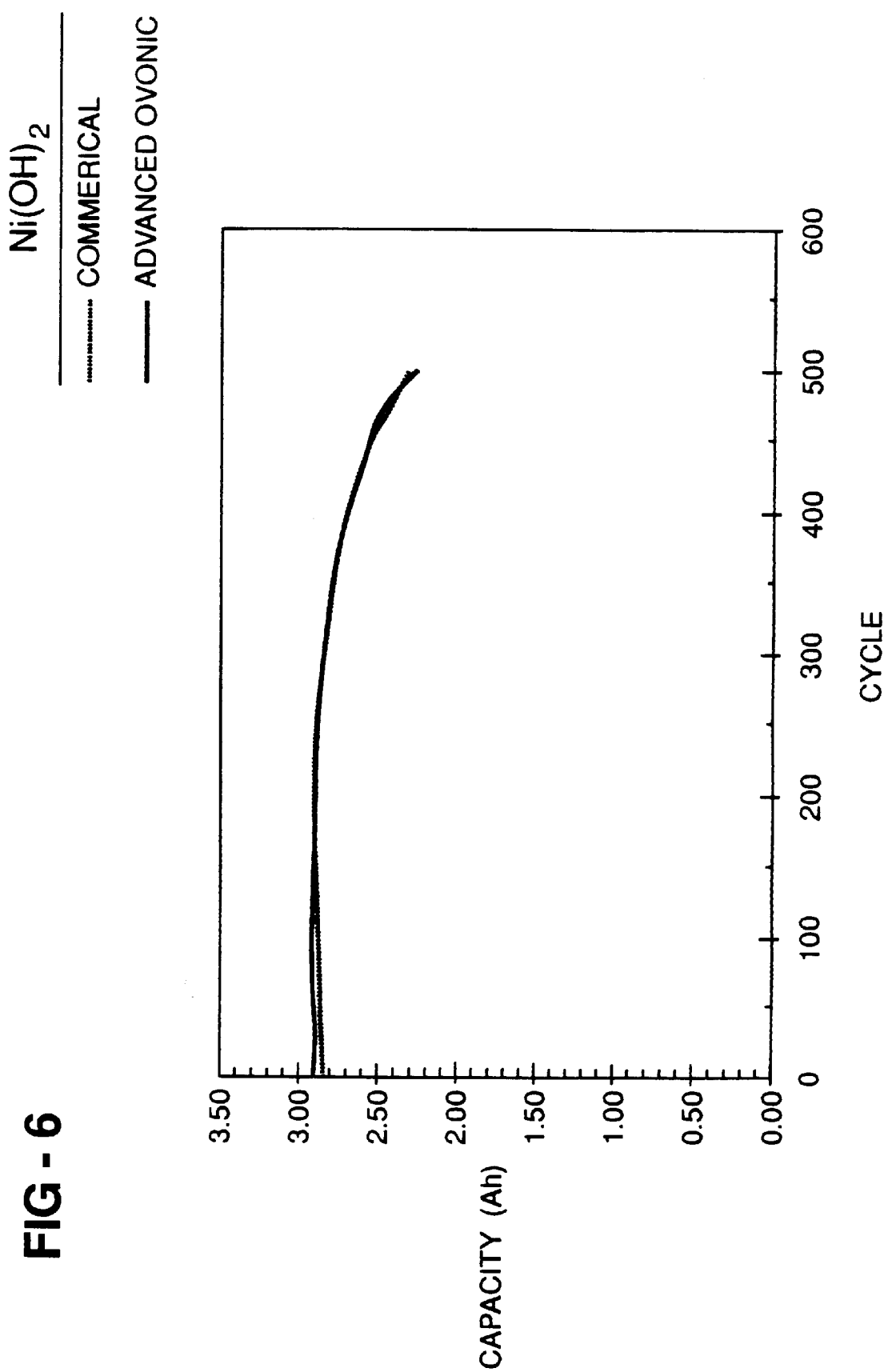
FIG. 6 is a graph showing the cycle life of nickel metal hydride cells made using the modified high capacity positive electrode of the present invention as compared to similar cells made with conventional nickel hydroxide material, cycles being plotted on the abscissa and capacity being plotted on the ordinate.

A significant deficiency of the prior art relating to γ-phase nickel hydroxide material was the failure of researchers to realize that regions of γ-phase material could be deliberately incorporated throughout portions of a β-phase nickel hydroxide "host matrix." OBC has shown that such "engineered" nickel hydroxide materials do not undergo the destructive density shifts and swelling that destroyed prior art nickel hydroxide electrodes and lead to the battery industry's universal adoption of additives to suppress γ-phase formation. The inventors noted that the presence of 5–25% γ-phase nickel hydroxide material during the early formation cycles of a NiMH battery results in higher initial capacity, which capacity is maintained throughout the life of the battery. This is distinctly different from the prior art that focuses on the deleterious effects of even small amounts of γ-phase material, such as 1% after 50 cycles, and methods to prevent the formation thereof. It is just such gradual unwanted formation of such non-engineered γ-phase material that is the cause of cycle life difficulties due to nickel hydroxide electrode swelling. Electrochemical tests have demonstrated the numerous benefits obtained when the highly modified nickel hydroxide material of the instant invention is used in nickel metal hydride batteries. These tests are illustrated in FIGS. 4–6 which show high capacity, long cycle life and great high temperature performance.

The intense focus of the prior art on addition of elements intended to prevent γ-phase formation was, in some respects, a step backwards in the development of improved nickel hydroxide materials. This work utilized the addition of one or two elements that, while reducing γ-phase formation, also reduced conductivity, promoted oxygen evolution (especially at high temperature), and reduced capacity.

The instant inventors began work on the present invention in a unique manner, by thinking of the nickel hydroxide material as being analogous to a conventional semiconductor, such as silicon. While semiconductors are described by electronic movement and excitation, proton movement are merely particles of a different size that can also move and be excited. Referring now to FIGS. 7–11, it will become readily apparent to those skilled in the art that the principle of conduction in nickel hydroxide displays striking similarity to such semiconductor material.

Specifically referring to FIG. 7, in an undoped semiconductor, such as silicon, charge carriers (in this example, electrons) are excited from the valence band to the conduction band thereof by thermal energy. The conductivity in the semiconductor is dominated by the number of free electrons present in the conduction band, the number being proportional to $\exp(-E_g/2kT)$, where $E_g$ is the energy gap between the valence band and the conduction band, k is Boltzmann's constant, and T is the temperature. In the case of nickel hydroxide material, the conduction is ionic and is dominated by the hopping of protons between adjacent sites that are separated by the activation energy, denoted by $E_a$. The hopping probability is proportional to $\exp(-E_a/kT)$, which one skilled in the art can readily see is analogous to semiconductor excitation energies. The total proton conduction will be the product of available protons/vacancies and hopping probability. This can be seen from the schematic diagram of conductivity vs. oxidation state illustrated in FIG. 9C. In the $2^+$ $Ni(OH)_2$ state of FIG. 9A, all sites are occupied by protons and ionic conduction is difficult to obtain due to the lack of empty sites. In the $3^+$ β-NiOOH state, conduction reaches a maximum due to the large number of protons and available sites. In the $4^+$ $NiO2$ oxidation state, the number of hopping protons decreases and therefore conduction decreases.

Each $Ni(OH)_2$ particle is composed of fine crystallites which have the same crystallographic orientation within the boundary of a crystallite, but not necessarily the same crystallographic orientation between different adjacent crystallites. It is important to note that disorder plays an important role in the inventions described in the subject patent application, for instance, in forming the fine crystallites described herein.

The proton/ionic conductivity in a typical $Ni(OH)_2$ particle is dominated by (1) conduction within crystallites and (2) conduction across the grain boundaries between adjacent crystallites. When the crystallite is too large, as indicated in FIG. 11A, the fully discharged $Ni(OH)_2$ does not have enough vacancies, created at the grain boundaries (GB), for the initial charging current to provide for a proton to hop from one vacancy to another vacancy, and therefore such large crystallites provide for relatively poor conductivity. It should be readily apparent that the activation energy of the positive electrode material ($E_a$) has to be adequate for a proton within the crystallite to move to an adjacent vacancy within a crystallite or adequate for a proton to move through the grain boundary to a site within an adjacent crystallite ($E_b$).

Figure 10A:
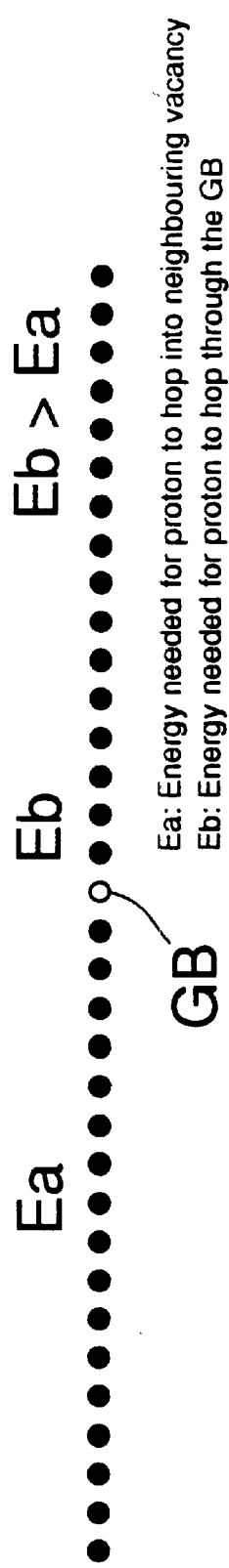
FIGS. 10A–10C is a highly stylized depiction of sites that occur in crystallites of nickel hydroxide material as a function of the size of the individual crystallites and the energy required for a proton to hop to a vacancy.
Figure 10B:
Figure 10C:

As the crystallite size becomes too small, as indicated in FIG. 10C, the preferential planes of conduction between adjacent crystal lattice conduction networks will not be aligned due to the presence of too many grain boundary vacancies for the protons to hop across. The local chemical environment of those proton sites near the grain boundary may be inadequate for the proton to hop and protonic conductivity is thereby impeded. Therefore, there exists an optimum crystallite size, approximately 50–150Å, more preferentially 60–130Å and most preferably 70–120Å, in which the proper number of grain boundary vacancies are present, said optimum size indicated in FIG. 10B. In this latter figure, sufficient vacancies are present for proper inter-crystallite conductivity to occur, and the protons have sufficient room to follow the proper conductive path (plane of conductivity) through the crystallite it has entered. It is important to note the crystallite size terminology used in this application is defined as a calculation result from Scherrer's equation using the full-width at half-maximum (FWHM) of one particular reflection peak, namely the (101) direction, of the x-ray diffraction pattern for-the nickel hydroxide electrode powder sample. This crystallite size may not correlate directly to the physical dimension of the fine crystals which make up the entire powder due to line broadenings from strains, trapped water and other ions, local compositional disorder, and other factors. Thus this quantity should not be compared to dimensions obtained from other direct methods, such as transmission electron microscopy. The FWHM's from various reflection peaks give different crystallite size values mainly due to the large distortion from a perfect crystal along the c-axis direction. The (101) reflection peak has been selected because systematic studies performed in-house show a close dependence between the electrochemical performance and the crystallite size calculated from the (101) reflection peak.

Figure 9B:
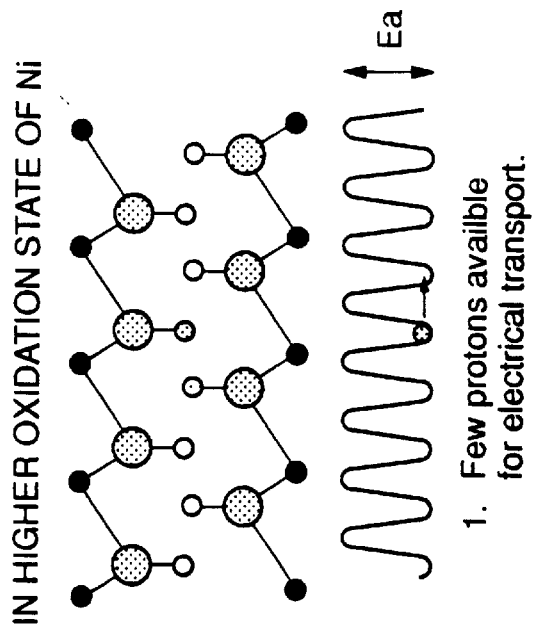
FIGS. 9A–9C are highly stylized depictions providing an illustrated explanation of semiconductor behavior in pure β-NiOOH as compared the behavior thereof in higher oxidation state of Ni.
Figure 9A:
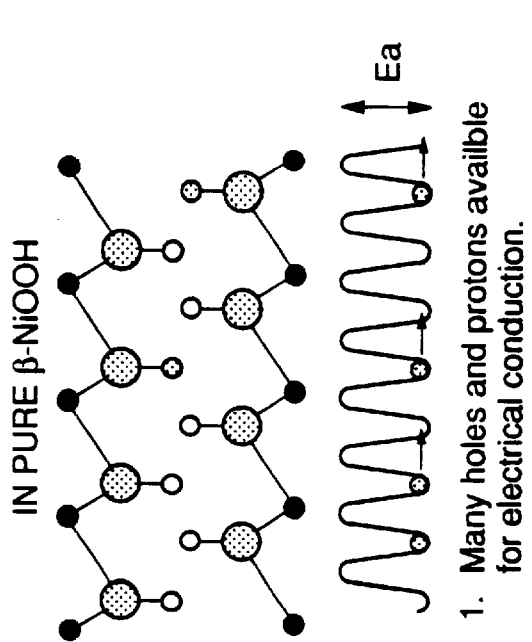
Figure 9C:
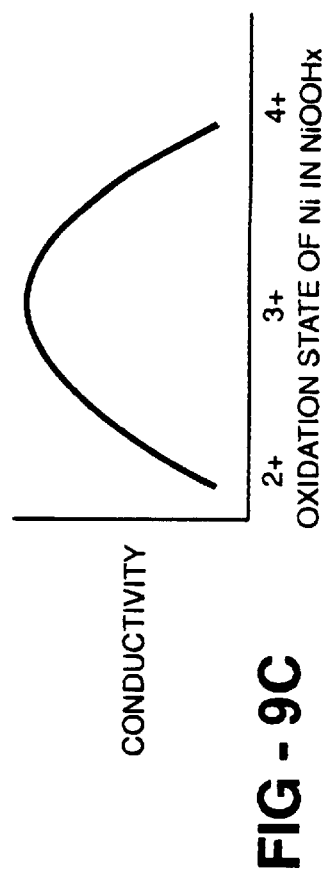

From a microscopic perspective, there are two relevant types of local energies; namely, ground-state energy and activation energy related to the proton hopping in a local environment. In a pure $Ni(OH)_2$ material, as indicated in FIGS. 7–9, each hydrogen atom sits in a site and is bonded to an oxygen atom with a chemical potential at the ground-state energy level. Though not wishing to be bound by theory, this ground state energy will mainly influence the local electron distribution. Without the consideration of electron transport, this ground-state energy can be simplified as the bonding energy of the proton to that site. On the other hand, activation energy is the energy barrier for a proton to hop between adjacent sites. In order to satisfy the local charge neutrality, an electron has to be conducted in the opposite direction along the Ni—O chain and also contributes to part of the activation energy. However, for simplicity, we will focus on the transport of the proton in the rest of this application. The ensuing focus on protonic conduction is due to its limiting nature and therefore controlling feature, since only the larger of protonic or electronic activation energy is relevant. The activation energy can be influenced by any change in the occupancy of neighboring hydrogen site, type of cations, the oxidation state of cations, the Ni—O valence electron distribution, and any other possible disturbance to the local electron distribution.

By alloying (substituting a similar metal such as cobalt) and/or doping (substituting a dissimilar metal such as Mg or Ca) it is possible to generate a spectrum of conductivity levels. By similar and dissimilar, substitution is being compared to nickel, and relates to elemental properties such as ionic radius, electronegativity, valency, etc. Such modification of alloyed materials effectively alters the chemical potential and activation energy, both at specific sites and on average. Note that the use of the term "doping" is used to refer to modified materials, i.e., materials having the conductivity thereof changed through the addition of dopant atoms; however, several atomic percent is required for doping the nickel hydroxide material of this invention. Although the current doping level is only about a few atomic percent or less, one should not underestimate the impact from a small amount of foreign ions introduced to the system. The substitution of Mg for Ni, for example, unambiguously affects the proton sites connecting the oxygen atoms with direct bondings to Mg. It will also affect proton sites connecting the nearest neighbor oxygen atoms and the second nearest neighboring oxygen atoms, and perhaps even the third nearest neighbor oxygen atoms. Thus one dopant can effect ten and perhaps hundreds of proton sites. When we introduce only one or two percent of dopant atoms, the entire host material can be modified depending on the type and effectiveness of the dopant species. In this regard, note that the principles of chemical modification invented by Ovshinsky and disclosed in U.S. Pat. No. 4,177,473, the disclosure of which is incorporated by reference, may be employed by analogy to alter conductivity to a desired level.

The present invention involves a unique approach for improving nickel hydroxide that takes advantage of the foregoing analysis. Where all previous workers have attempted to enhance nickel hydroxide conductivity by establishing a separate external electronic conductive network, the present inventors have discovered how to increase the inherent ionic conductivity of the nickel hydroxide material itself. This is accomplished by engineering or specifically tailoring the activation energy in and/or the chemical potential of the nickel hydroxide material to permit protons to more readily move through the nickel hydroxide material and by engineering the crystallite size for enhanced conductivity. In fact, the inventors have discovered that a metal hydroxide may be "doped" (as explained above) and have modified the chemistry and microstructure (via processing) to provide a custom engineered positive electrode material for NiMH batteries.

The present invention achieves this activation energy shift by incorporating at least three modifier elements throughout the bulk of the nickel hydroxide material. Note with respect to the incorporation of multiple modifier elements, none of these elements will be introduced in percentages sufficient to inhibit the formation of γ-phase material. Such incorporation is totally different from the prior art where improvements in conductivity focused exclusively on surface treatments to create an electronically conductive network that interconnected crystallites of the nickel hydroxide material. Without wishing to be bound by theory, it appears that the modification of electrical conductivity, chemical potential and activation energy can be explained by thinking of nickel hydroxide as having a spectrum of nickel oxygen bond strengths. When one or more of the appropriate additive elements is incorporated into the bulk of the material, the additive(s) influences the bond strengths thereby modifying the activation energy. While in most cases the focus of the present invention is to decrease activation energy to promote increased proton storage and transport, the term modify is used to denote that special application such as high temperature operation that could benefit from higher activation energy from a thermodynamic and electrochemical perspective (to compensate for competing reactions such as oxygen evolution).

This spectrum of NiO—H bond strengths can be analogized to practical metal hydride alloys in which the thermodynamic properties of the alloys effectively control electrochemical performance. In the case of advanced nickel hydroxide materials, it has been established that γ-phase NiOOH material has the capability of transferring 1.7–2.0 electrons per each nickel atom. Yet, prior art nickel hydroxide material, i.e., material in conventional commercial batteries, may only use 0.7–0.8 electrons per nickel atom and the best performing materials only use about 0.9–1.0 electrons per nickel atom.

This discrepancy between theoretical capacity and the capacity achieved by the prior art can be explained by the fact that nickel hydroxide has an enormous number of available sites for hydrogen storage, but that many or most of those sites cannot be effectively utilized. This is because:

the NiO—H bond is outside the thermodynamic window accessible for use in a sealed, alkaline electrolyte cell;

the competing $O_2$ evolution reaction;

poor conductivity where highly charged nickel oxihydroxide material cannot be fully discharged or is at least severely rate dependent, or pockets of charged material may exist even after discharge due to such poor conductivity;

the inaccessibility of those sites because the surface of the particles does not allow electrolyte penetration, and the unoptimized crystallite size make the conductivity and "active surface area" of the crystallites insufficient.

The activation energy for proton motion of the nickel hydroxide can be considered in several ways. First, it is important to understand that the conductivity of pure nickel hydroxide is very small. While the prior art has given special attention to enhanced external electronic conductivity (cobalt oxide additives for example), proton transport internally of the nickel hydroxide itself is of far greater importance.

Though not wishing to be bound by theory and with reference to FIGS. 11 and 12, the instant inventors believe that there exists an undesirable situation, illustrated in FIG. 11F, in which the spherical nickel hydroxide 15 includes isolated regions of high conductivity NiOOH 15a is surrounded by low-conductivity $Ni(OH)_2$ 15b. This condition may exist within the bulk of a $Ni(OH)_2$ particle, in which case a portion of the particle effectively becomes electrically isolated and this portion of the material is then unaccessible for actual use. One way to envision this problem in a prior art nickel hydroxide particle, of for example 10–15 μm in size., is to consider that there is a core of NiOOH at the center (farthest away from the current collector) which cannot be discharged due to its location remote of the substrate 13. This is one of the conditions illustrated in FIG. 11.

More specifically, FIGS. 11A–C show in highly stylized form a spherical particle 15 of nickel hydroxide positive electrode material. It should be appreciated that the circumferential portion of said particle has been heretofore coated with a conductive cobalt oxide or oxyhydroxide annulus 17. As the particle 15 is charged, FIG. 11A shows 20% of the $Ni(OH)_2$ transformed to NiOOH, FIG. 11B shows 60% of the $Ni(OH)_2$ transformed to NiOOH and FIG. 11C shows 100% of the $Ni(OH)_2$ transformed to NiOOH. Now turning to the discharge of the fully charged particle, FIG. 11D shows that approximately 20% of the particle has been transformed back to $Ni(OH)_2$ and that the discharged portion is contiguous to the conductive substrate matrix 13 in contact with one part of the particle 15. FIG. 11E shows particle 15 under 40% discharge illustrating that about 40% of the NiOOH has now been transformed to the $Ni(OH)_2$ phase and again, the discharged $Ni(OH)_2$ region is formed by that portion of the particle contiguous the conductive matrix 13 and coating 17. Finally, note that under the 60% discharge condition illustrated in FIG. 11F, approximately 60% of the NiOOH has been transformed back to the $Ni(OH)_2$ phase and that there remains an isolated NiOOH region that, due to the lack of an internal conductive network within the particle, will be very difficult to further discharge, especially at a high drain rate. Even the annulus 17 of conductive cobalt compound will not significantly aid further discharge because the intervening regions of low conductivity $Ni(OH)_2$ between the charged NiOOH and the cobalt compounds.

Though not wishing to be bound by theory, the present inventors believe there are several possible alternative pathways to facilitate charge transport within the positive electrode material. $Ni(OH)_2$ is an ionic solid with predetermined proton sites. Proton transport is viewed as a hopping motion from an occupied bonding site to an empty neighboring site, requiring one proton, an empty site and an appropriate activation energy. While interstitial ion motion within nickel hydroxide would seem to be precluded (since there is no half-filled orbital as in the case of the surface or interface) and would therefore seem to inhibit collective motion of protons as in a metal, it is possible that in modified materials of the present invention having a spectrum of hydrogen binding energies due to changes in local order, interstitial proton motion may contribute. It is also possible that ions move rapidly along grain boundaries where they are less strongly bonded than in the bulk. Grain boundaries offer initially empty sites for hopping. It is still further possible that a continuation of transport within crystallites and at crystallite boundaries dominates proton movement. In this case, proton motion can be enhanced by orientation and alignment of crystallites in particular planes. Additionally, the incorporation of substituting elements may increase the lattice constant of the crystallites which in turn promotes improved proton transport. These different alternative pathways are important in that, for example, the term "reduced activation energy" may be referring to the activation energy for proton transport from one binding site to another empty site within a crystallite or alternately may refer to the activation energy for proton transport to a vacancy along a grain boundary. Both. references are within the spirit and scope of this invention.

Turning now to FIG. 12, there is illustrated in highly-stylized form, a spherical nickel hydroxide particle 15 encapsulated by a conductive cobalt compound 17 under various states of charge and discharge for positive electrode material.

Figure 12C:
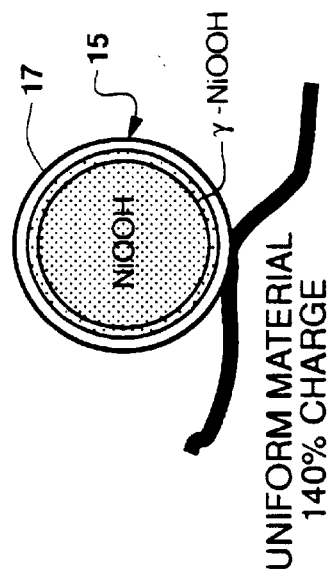
FIGS. 12A–12E are stylized depictions of spherical particles of nickel hydroxide material showing the different conductivities of the $Ni(OH)_2$ and γ-phase NiOOH for conventional and disordered positive electrode material at different states of charge.
Figure 12E:
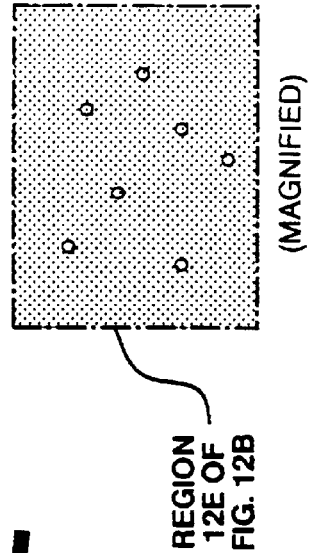
Figure 12D:
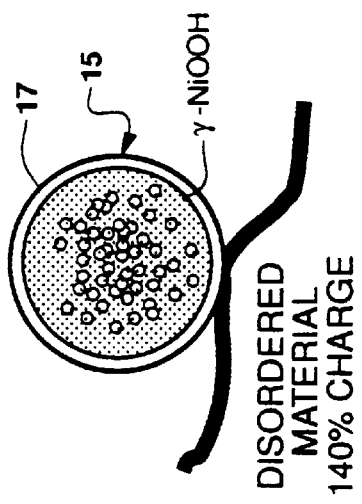
Figure 12A:
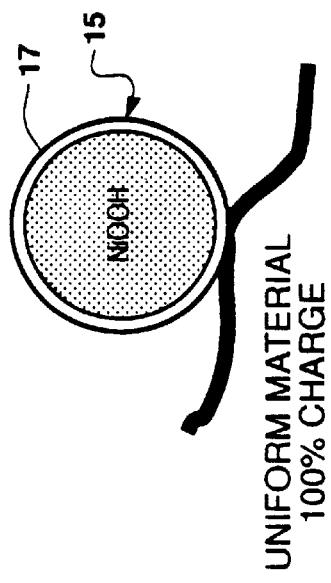
Figure 12B:
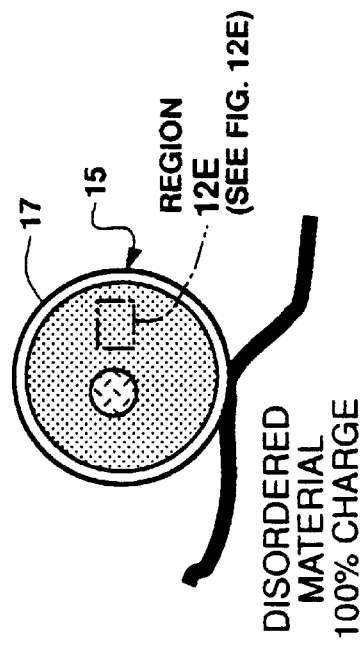

As one charges the particle 15 of nickel hydroxide material to more than 100% of its theoretical capacity.(assuming one electron transfer per Ni-atom), the Ni in the outmost layer of the crystallites is charged to a higher oxidation state, thereby lowering the conductivity thereof and preventing further formation of γ-phase NiOOH into the interior recesses of the particle (see FIG. 12B). However, if one adds a greater degree of disorder into the positive electrode material, the interior of the crystallites are not created uniformly. Some regions within the crystallites are formed with lower activation energy and thus become easier to charge and discharge. During light charge, some regions will be quickly converted to a higher oxidation state and improve the overall conducting network. As shown, during overcharge, the volume percentage of γ-phase NiOOH can be increased by providing a dispersive distribution of regions of positive electrode material having reduced activation energy. The magnified illustration of FIG. 12E, as well as the 140% overcharge illustrated in FIG. 12D, show that the isolated regions of low conductivity γ-phase NiOOH are in contact with the high conductivity NiOOH and therefore are accessible even under high drain rate conditions.

Ignoring for a moment high capacity γ-phase regions, the above arguments apply to a completely βII–βIII phase transition (corresponding to the charged/discharged state, respectively, of the nickel hydroxide material). Because nickel hydroxide materials. in current commercial use only provide 80–90% of the one electron per nickel atom transfer capability in a sealed NiMH battery configured to operate with starved electrolyte and a marginal conductivity network (due to cost, space and weight limitations), it should be apparent that the highly conductive, modified nickel hydroxide material of the present invention can result in a significant improvement. By promoting higher conductivity within and throughout the bulk of the active material, the subject inventors have increased utilization of the active nickel hydroxide material that undergoes even βII–βIII phase transitions to 95% or greater.

As discussed above, a variety of prior researchers have added various combinations of elements to the nickel hydroxide material, but none have added such elements so as to shift or to modify (generally reduce) the activation energy for proton motion of the nickel hydroxide material. In fact, while expensive cobalt is commonly added to nickel hydroxide to improve conductivity, the instant inventors have discovered that combinations of modifier elements work better than cobalt alone. (In the present invention, the incorporation of modifier elements, throughout the bulk of the material is also referred to as "incorporating modifiers within or throughout the material.")

The benefit of using dopants in addition to, and as a substitute for cobalt, cannot be over emphasized. Cobalt is very expense relative to the other battery materials, and therefore, significantly influences final NiMH battery cost. Cobalt also is uniquely capable of being almost completely substituted for Ni and soluble within the nickel hydroxide host matrix. The instant inventors believe that nickel hydroxide materials modified only with cobalt have a tendency to be single phase. Because these materials avoid becoming "multiphase", and disordered, they cannot provide the following desirable properties:

formation of a spectrum of NiO to H binding energies formation of small crystallites (improving accessibility)

increased conductivity multiple electron transfer per Ni atom resistant to swelling and operable over a wide range of temperatures engineering local and intermediate range order The instant inventors have found that combinations of elements (such as Ni—Co—Zn—Mg—Ca, Ni—Co—Zn—Mg—Ca—Mn—Cu) show synergistic behavior relative to the expected electrochemical effects from just the individual elements alone.

Though not wishing to be bound by theory, the instant inventors believe that multi-element modifiers reduce the activation energy for proton motion of the nickel hydroxide material, encouraging the presence of small crystallites and encouraging a multiphase structure. This, in turn, promotes electrolyte accessibility and interaction at crystallite boundaries. In simple terms, the activation energy of the nickel hydroxide is reduced by the appropriate selection, addition and distribution of modifiers within the bulk of the nickel hydroxide material, which also affects the microstructure, local and intermediate order within the nickel hydroxide.

For example, while the prior art describes the addition of Ca "to nickel hydroxide material", a close reading of the references shows that the added Ca is not incorporated in the bulk of the material as described in the present invention. Specifically, U.S. Pat. Nos. 5,451,475 and 5,571,636 (discussed above) describe the addition of Ca such that it is absorbed onto the surface of the nickel hydroxide; U.S. Pat. Nos. 5,455,125 and 5,466,543 (also discussed above) describe the addition of calcium oxide, hydroxide, fluoride, peroxide, or silicate, or a calcium salt to basic nickel hydroxide material to create solid solution regions within the active material. Further, these references contain no teaching of the improved capacity exhibited by materials of the present invention. In fact, Ca added internally in prior art references displayed a definite and significant reduction in electrode capacity. Again, recall that the prior art mistakenly focuses on the use of additives to prevent/inhibit γ-phase formation. In order for Ca to accomplish this function, a very high percentage, up to 10% was used. This level of single element additive severely reduces the number of available nickel storage sites (because a corresponding reduction of active material must occur), and fails on its own to improve conductivity. Only multielement modification provides the spectrum of binding and activation energies necessary for high capacity and high stability required for a battery to be commercially viable. It is noteworthy that until the instant invention, (for the reasons set forth above) no coprecipitated Ca- containing nickel hydroxide has been successfully implemented.

Another aspect of the present invention involves a method of incorporating Ca throughout the bulk of the material. While Ni, Co, Zn, Mg, Mn and Cu can be added via a nitrate complex or a sulfate complex, the addition of Ca is much more restricted. As a result and contrary to the suggestion of the prior art, the present inventors have found that Ca cannot be added through a sulfate complex. This poses a major problem in that sulfate precipitation is now the accepted industry practice (due to a desire to avoid nitrate contaminants that are known to encourage detrimental self-discharge within NiCd and NiMH batteries). Thus, a practical method of putting Ca into the bulk of the nickel hydroxide material, regardless of purpose, is described for the first time in the present disclosure. In view of this discovery, there is described herein the method by which at least one modifier element is incorporated throughout the bulk of the nickel hydroxide material. This is accomplished in a single precipitation reactor using a dual sulfate/nitrate, a dual sulfate/chloride, or a sulfate, nitrate, chloride combination or the like type of complex rather than an individual sulfate complex or nitrate complex.

Calcium modified nickel hydroxide is know in the literature. In the aforementioned U.S. Pat. No. Re. 34,752 (Oshitani, et al.), NiCoCa, NiCoZn, NiCoMg and NiCoCd materials were studied in relation to the properties of Cd, Zn, Cu, Mg, respectively, to prevent and/or inhibit the formation of γ-phase nickel hydroxide. The addition of Cd at levels of 1–3 wt % had proven to be an extremely effective γ-phase suppressant, while the addition of Zn at levels of about 3–6 wt % were found to yield similar, though not quite as good results. It was the toxicity of Cd in NiMH batteries that required manufacturers to use Zn as an γ-phase inhibitor. At the same time, experiments showed that the addition of Ca and Mg modifiers in quantities as high as 10 wt % or greater did not achieve the same effectiveness as Zn or Cd, even if one ignored the capacity sacrifice necessitated by the addition of such a large amount. Thus, the prior art quite clearly teaches away from the use of Ca or Mg. Not surprisingly, in the hundreds of millions of NiMH batteries produced each year, Ni—Co—Zn nickel hydroxide is the standard.

In addition, Ni—Co—Zn compounds are known to have very poor charging efficiency at the high temperatures to which devices such as laptop computers and electric vehicles are subjected (55°–65° C.). At these temperatures, as much as 40–55% of the room temperature capacity of Ni—Co—Zn nickel hydroxide may be lost. To combat this problem, external additives such as Ca(OH)$_2$ and CaF$_2$ have been added at levels of about 3%, thereby providing a moderate benefit for elevated temperature performance of about 5–7% with a concurrent reduction in room temperature performance of about 3%, due to the weight and space taken up by the additive.

As discussed below in greater detail, the instant inventors have observed that the internal (bulk) addition of only 1.0 wt % Ca with 0.5 wt % Mg to a Ni—Co—Zn based composition actually provides higher room temperature utilization. Further, at elevated temperatures, as high as 55° C., the direct loss of 40–55% capacity has been reduced to a loss of only 4–7% of capacity.

Further, the addition of Ca in a multicomponent Ni—Co—Zn is equally significant. It is believed that a multielement calcium-containing nickel hydroxide composition has thus far only been achieved through the use of the method, described below, that forms one significant aspect of the present invention.

PROCESSING

Figure 3:
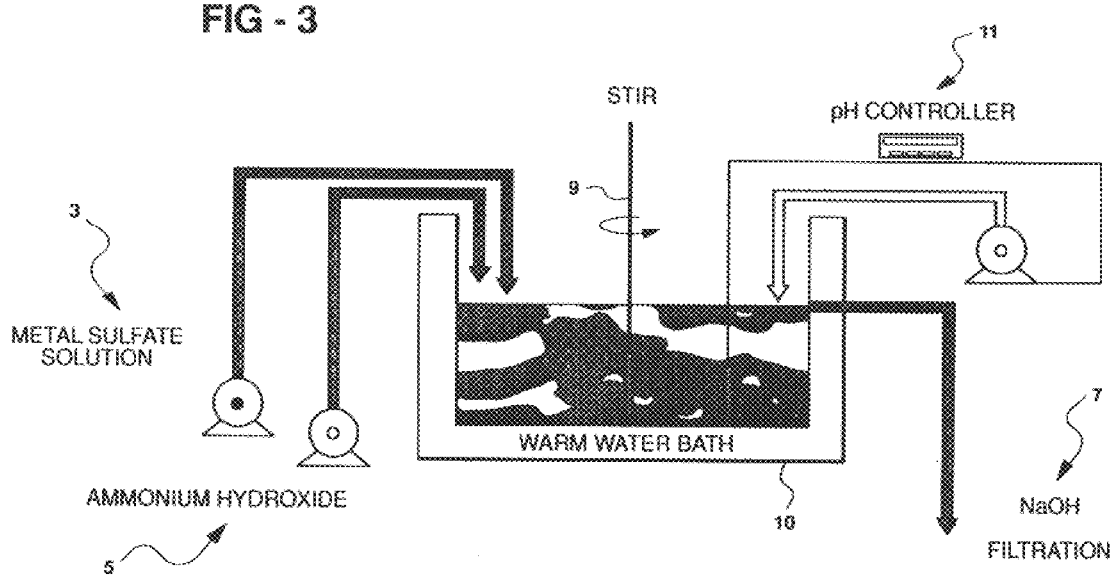
FIG. 3 is a stylistic schematic diagram of the process for producing the modified nickel hydroxide material of the present invention in a single reaction chamber.

In the processing method of the instant invention, as schematically illustrated in FIG. 3, great care must be taken with certain unexpected processing parameters. For instance, the liquid saturation of ammonia versus its vapor or head space saturation in the reactor is critical. The present inventors have found the ammonia concentration in the reactor significantly influences the final properties of the resultant powder with respect to crystallinity and tap density. Since ammonium hydroxide is continuously metered into the reactor, but is present in excess, part of the ammonia must be removed via the reactor head space. The inventors have found that care must be exercised to avoid a "crust" forming on the top of the liquid; that is to avoid the liquid surface area in the reactor that is exposed to air from inadvertently charring. The inventors also control the incoming and exiting air stream in terms of air flow rate and humidity. For a 100 kg/day reaction vessel, the inventors have determined that an air flow of about 50 or greater ft$^3$/minute is adequate, with a relative humidity below about 65%. Properly managed, the materials of the present invention having the proper density and degree of crystallinity are consistently obtainable in volume production. If, on the other hand, process parameters such as the head space saturation or concentration of ammonia are ignored, it is more likely than not that poor quality nickel hydroxide material will be produced.

It is possible to produce the nickel hydroxide materials of the present invention using three modifiers, four modifiers, or more. These modifier elements are preferably chosen from the group consisting of: Al, Bi, Ca, Co, Cr, Cu, Fe, In, La, Mg, Mn, Ru, Sb, Sn, Ti, Y, and Zn. Most preferably the added multielement modifiers make the nickel hydroxide formula look like the following:

Ni—Co—Zn—Mg—Ca
Ni—Co—Zn—Mn—Mg—Ca
Ni—Co—Zn—Mg—Ca—Cu—Mn

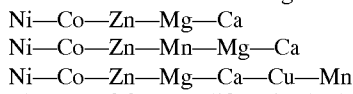

The use of four modifiers in the bulk of the material is completely new. No research work has introduced four modifiers in nickel hydroxide positive electrode material for any purpose. More particularly, no researcher has suggested, taught or even implied the use of the unique combination of Ca, Co, Mg, and Zn as described in the present invention. Possible combinations of modifiers include, but are not limited to: Ni—Co—Zn—Mn, Ni—Co—Zn—Cu, Ni—Co—Zn—Mg and Ni—Co—Zn—Ca. In these combinations, Mg acts as a substitute for Ca and Zn from the perspective of high temperature and cycle life improvement; Mn and Cu act as a substitute for Co from the perspective of conductivity and utilization; and Mg, Fe, Mn and Cu act as a substitute for Zn from the perspective of oxygen evolution suppression. It is to be understood that although we state that the combination of modifier elements set forth above "act as a substitute . . .", we mean that these combinations multielement perform at least as well electrochemically or provide superior electrochemical performance at a lower cost or can be produced in a more reliable economic manner. As stated previously, the present inventors believe that the deliberate introduction of multiple elements is highly desirable and will increase disorder. The spectrum of binding energies and reduced activation energies results in higher hydrogen storage capacity and greater proton motion, which in turn results in practically higher utilization and greater power within the battery electrode.

In general, the nickel hydroxide materials of the present invention are high density, uniform, spherical particles with crystallite size less than 120Å. This is in sharp contrast to materials of the prior art where the particles with crystallite sizes typically greater than 120Å. More specifically, the crystallite size of the particles of the nickel hydroxide material of the present invention range from 50–150Å, more preferably 60–103 Å and most preferably 70–100 Å. These materials provide superior capacity.

Another unique aspect of the nickel hydroxide material of the present invention compared to the prior art material is that the capacity of the material increases as the cobalt concentration decreases. This can be see in Table 2, below. This is completely contrary to the teaching of the prior art; namely, that higher capacity materials result from higher cobalt concentrations.

Without wishing to be bound by theory, it is believed that in the materials of the present invention, decreased Co means that more active nickel sites are available. While many workers in the field seem to believe that cobalt is participating along with the nickel to provide active sites, the reality is that only nickel sites provide active storage sites. As a result, the materials of the present invention with the least amount of Co provide more available nickel sites and, consequently, provide the greatest number of accessible storage sites, resulting in the highest capacity.

Based on the observation that materials having a reduced amount of additive elements have increased storage sites, one might be tempted to conclude that the best electrode material would be pure nickel hydroxide. This is not the case. Pure nickel hydroxide has insufficient conductivity to function efficiently as a positive electrode material, particularly under high drain rate conditions where utilization is especially poor. This problem is addressed, however marginally, as described in the prior art through the use of various additives (like Co) that are desired to improve conductivity.

The present invention takes a completely new approach to enhancing the conductivity of nickel hydroxide material. As mentioned above, and with reference to FIGS. 7–9, rather than establishing a separate conductive network, the present invention increases the inherent conductivity of nickel hydroxide material by modifying the activation energy through the introduction of appropriate dopant and/or modifier elements throughout the nickel hydroxide material to promote improved proton transport. The subject inventive materials also provide a larger number of protons. The present invention achieves this modification in activation energy by incorporating modifier elements in the bulk of the crystallites of nickel hydroxide material. Such an incorporation is different from the prior art where the focus was on external surface treatments to create an alternate conductive network that merely joined adjacent nickel hydroxide particles. The inherently higher conductivity nickel hydroxide bulk material of this invention simultaneously addresses:

capacity and utilization power and rate capability charge acceptance (high temperature)

cycle life

Previous nickel hydroxide materials, as described above, definitively sacrificed some performance features (usually capacity) to promote either electrical conductivity or charge acceptance. Modification, pursuant to the concepts set forth herein, in contrast to the prior art, involves no trade off in performance features. In fact, the modified nickel hydroxide materials of the present invention yield, simultaneously, an improvement in numerous electrochemical performance features, as well as greatly enhanced commercial viability. The highly conductive active materials of the present invention are particularly significant in batteries for electric vehicles and power tools, i.e., high discharge rate applications. This will continue to become all the more significant for hybrid electric vehicles where the premium is on peak power and commercial viability especially when the present NiMH EV peak power of 220–600 W/Kg is raised to 1000 W/Kg.

An exemplary nickel hydroxide positive electrode of the present invention of a $Ni_{93}Co_5Zn_{0.5}Mg_{0.5}Ca_{1.0}$ composition, provides high capacity (over 185 mAh/g sealed cell total electrode), long cycle life (over 400cycles), high tap density (over 2.2 g/cc), high loading (over 2.7g/cc) with crystallite sizes of less than 90Å. The nickel hydroxide active material contains at least there modifiers for specially modifying activation energy and chemical site potential. Surprisingly, in the materials of the present invention, the amount of γ-phase material present is inversely related to the amount of Co present. This is completely contrary to teachings of the prior art. In particular, Delmas (cited above), found that the amount of γ-phase present was proportional to the amount of Co. Accordingly, the cobalt level in the nickel hydroxide material has been reduced from 5% to 1% using inexpensive manganese copper complexes as a replacement.

Oxygen evolution sites on the surface of the nickel hydroxide material can be thought of as catalytic sites. In considering this, it seems counter intuitive, and in fact synergistic, that modification throughout the bulk of the material, as described in the present invention, would be more effective than the surface treatment as described in the prior art. This is counter-intuitive because prior art nickel hydroxide materials are erroneously referred to as "high density spherical materials." This gives the false impression that the active sites are present on smooth, hard, solid geometrically spherical surfaces. In reality (as can be seen by inspecting FIGS. 1 and 2) the majority of the nickel hydroxide particles are extremely irregular and porous. As a result, prior art nickel hydroxide materials have a very large surface area of about 10 m/g$^2$. Since each of these active surfaces can be an oxygen evolution site, an effective surface treatment would have to coat most of this 10 m/g$^2$ area to be effective. Of course, this is virtually impossible and explains why even the 3% calcium hydroxide or calcium fluoride additives of the prior art demonstrate only a marginal effect on high temperature performance.

In contrast to the prior art, in the materials of the present invention, the oxygen evolution suppressants (such as Ca, Mg and preferably Ca/Mg) are placed at not only some of the active material surfaces, but in fact, in close proximity to each nickel atom within the nickel hydroxide matrix. This atomic proximity is crucial. Prior art high temperature oxygen evolution suppressants (of which $Ca(OH)_2$, $CaF_2$ are the most effective) fail because nickel hydroxide particles have very high surface areas and each portion of that large surface area is a potential oxygen evolution site. Thus, it is difficult, if not impossible, to add enough external suppressant and distribute it evenly over the surface area. The present invention adds oxygen evolution suppressants at the most effective locations, i.e., atomically distributed throughout the material, which can only be accomplished during the original fabrication of the active material. In this manner, as each new surface is formed, the oxygen suppressant element is automatically placed in the correct atomic location thereby creating an engineered local atomic environment.

In the bulk modified nickel hydroxide materials of the present invention, magnesium and calcium in combination, suppress oxygen evolution, and this suppression effect is achieved even when magnesium and calcium are added in only, small amounts. This is contrary to the prior art, that reports when only calcium is added externally, it provides superior oxygen evolution capability. Without wishing to be bound by theory, it is believed that in the present invention, the calcium/magnesium combination acts to control the microstructure of the nickel hydroxide material. Such microstructure control is responsible for particle uniformity, improved tap density, and optimum (small) crystallite size. Such microstructure is very dependent on process parameters and can also be achieved by controlling one or more of the following: a specific amount of the combination of a modifier and dopant elements, specific elements selected as modifiers and dopants, a specific reaction rate, a specific reaction temperature, a specific concentration of $MeSO_4$ and NaOH solutions, a specific ammonia concentration, a specific stirring rate and a specific reaction residence time, where Me is the combination of Ni and other additional metallic elements. As detailed hereinafter, a schematic flow diagram of the reaction process is illustrated in FIG. 5 and the aforementioned process parameters will be described in detail with respect thereto.

As previously mentioned, the practical advantage of reducing the amount of cobalt in the nickel-hydroxide of the present invention is cost. The use of less expensive modifiers, such as copper and manganese, to replace cobalt will produce significant savings. However, the prior art teaches that cobalt is the most effective conductivity enhancing modifier element and that manganese or copper reduce active material utilization, thereby teaching away from the use of Mn or Cu. The present inventors do not envision a single element replacement of Co with, for instance Mn; but again, follow the teachings of disorder; namely, that efficient multielemental substitution can, if judiciously selected, provide a greater effect than single elements alone. Therefore, it has been shown that CoMnCu or other elements in combination will work better than Co alone, providing decreased usage of cobalt, improved utilization, higher capacity and concurrent cost savings. The synergy of such multielemental substitution should be readily apparent in view of the foregoing discussion.

With reference to FIG. 3, a unique process is schematically illustrated which has been developed for fabricating, on a volume basis, the nickel hydroxide materials of the present invention. This process comprises combining $MeNO_3$, $MeSO_4(3)$, $NH_4OH(5)$ and $NaOH(7)$ in a single reactor (10), maintaining the reactor at a constant temperature of 20–100° C. (more preferably 40–80° C. and most preferably 50–70C.), agitating (9) the combination at a rate of 400–100 rpm (more preferably 500–900 rpm and most preferably 700–800 rpm) and controlling the pH 11 of the agitating combination at a value between 9–13 (more preferably at 10–12 and most preferably at 10.5–12.0) and controlling both the liquid phase and vapor phase ammonia concentration. The combination set forth above includes Ni and the metal modifier(s) that will be incorporated into the final modified nickel hydroxide materials of the present invention. Additional modifiers may be chosen from the group consisting of Al, Bi, Co, Cr, Cu, Fe, In, La (and other rare earths), Mg, Mn, Ru, Sb, Sn, Ti, Zn, Ba, Si and Sr.

This $MeSO_4$ solution is formulated by mixing 3–30 wt %, more preferably 5–25% and most preferably 7–12% $NiSO_4$ with other sulfate solutions containing the desired modifier(s) Overall, the metal sulfate solution added to the reactor is a 0.5–10M, more preferably 1–7M and most preferably 2–5M solution. The $NH_4OH$ solution added to the reactor is 2–30M, more preferably 5–20M and most preferably 8–15M solution. The NaOH solution added to the reactor is a 5–50 wt %, more preferably 8–40% and most preferably a 15–30% solution. Deionized water is used throughout for all necessary dissolutions and dilutions.

As stated above, the pH of the mixture in the reactor must be controlled. The control of the pH can be accomplished by any appropriate method known to routineers in the art, preferably through the addition of a base as needed. The addition of a base such as KOH or NaOH is preferred. Most preferably, 20–60 wt % KOH or NaOH is used. Cost considerations dictate that NaOH be preferably recovered and used wherever possible. The temperature of the mixture in the reactor should be maintained at the temperatures described above. In order to assure optimum contact between the components of the mixture introduced into the reactor, mixing or agitation should be provided. The mixing used can be any type known in the art, such as stirring, agitating or ultrasonic, but must attain the rates set forth hereinabove.

As mentioned earlier in this specification, in order to efficiently incorporate calcium into the bulk of the modified nickel hydroxide material of the present invention, it is preferable that the calcium is not part of the metal sulfate solution due to the low solubility of Ca in sulfate solution. Rather, calcium should be formulated T into a separate $Ca(NO_3)_2$, CaCl or the like solution that is introduced independently to the reactor. The $Ca(NO_3)_2$ or CaCl introduced into the reactor is a 0.5–20 wt %, more preferably a 2–15% and most preferably a 11–18% solution in $H_2O$.

The fabrication of nickel hydroxide material, according to the present invention, involves a novel continuous precipitation process. Because it is a continuous process, it is necessary to control the addition of each of the components and the removal of the resultant slurry (containing precipitated nickel hydroxide material) at complimentary rates so that the slurry contains the maximum amount of precipitate and the minimum amount of unreacted components. The above described operating conditions for this continuous process have provided a remarkably high yield of 99.98%. The process is novel in several aspects. First, it is completely new to apply a continuously stirred tank reactor (CSTR) concept to the manufacture of nickel hydroxide. All known prior art references (see Hyundai Motor Company Patent No. 5,498,403) indicate the necessity of employing two reactors, in series, involving the formation of a preamine complex. The two reactor approach has been considered vital in order to achieve high density, spherical nickel hydroxide. However, we believe two reactors in fact create tremendous difficulties in balancing two such vastly different reaction rates as the preamine commplexing and the actual nickel hydroxide precipitation. Disadvantages of a two reactor approach include:

premature precipitation in the first reactor resulting in poor tap density and uncontrolled particle size.

poor yield because very high excess ammonia must be used in the first reactor.

high effluent because of the use of a dilute sulfate solution.

complexity in balancing two reactors reaction rates from an automatic control standpoint.

corrosion. In the second reactor, a very high pH (>12) must be used to break the nickel ammonia complex. This high pH can destroy the pH electrodes.

The two reactor approach was considered vital to ensure the formation of a nickel ammonium complex prior to precipitation, to slow the precipitation reaction and allow high density particles to form. The objective of high powder density cannot be overstated: for use in batteries, active material loading is crucial to the energy density of the overall positive electrode and thus the overall batteries. All known attempts to precipitate high density spherical nickel hydroxide without careful formation of the nickel ammonium complex failed completely to achieve commercially viable high density material, and have led to a worldwide use of a two reactor manufacturing process.

The present inventors noted the CSTR approach vastly simplifies processing if it could somehow be used, being proven and commonly used in other chemical processing. The inventors realized that the nickel ammonium complex can be formed and destroyed simultaneously, that a short life of the nickel ammonium complex was no problem. Therefore, under the reactant concentrations described previously, and the reactor conditions of temperature, mixing, pH and constituent concentrations, that formation of the nickel ammonia complex and subsequent immediate precipitation to nickel hydroxide can occur simultaneously. The inventors then recognized that the single reactor CSTR process can be used with the following advantages:

- highly concentrated reactant solutions can be used, reducing amount of effluent streams.
- lower pH can be used, extending pH control electrode life and reliability.
- simplicity in processing by eliminating the need to "balance" two reactors.

Once the slurry is drawn off from the reactor, it is filtered to separate the precipitate from the liquid. The liquid is then recycled and the precipitate processed to produce the modified nickel hydroxide of the present invention.

NaOH from tank 12, MeSO$_4$ (consisting of NiSO$_4$, CoSO$_4$, MgSO$_4$ and ZnSO$_4$ from tank 14, NH$_4$OH from tank 16, and Ca(NO$_3$)$_2$ from tank 18 were introduced into the reactor 10. As the ingredients were introduced, they were constantly stirred, as by propeller 20, at 850 rpm and the contents of the reactor were maintained at 50° C. The pH of the mixture was maintained at 12. The resulting precipitate of modified nickel hydroxide material had the following composition:

$$Ni_{93}Co_5Zn_{0.5}Mg_{0.5}Ca_1. \quad (1)$$

This process was repeated with modified quantities of the precursor constituents to yield modified nickel hydroxide having the following composition:

$$Ni_{95}Co_3Zn_{0.5}Mg_{0.5}Ca_1. \quad (2)$$

These materials both represent preferred embodiments of the present invention.

Commercially available, prior art, nickel hydroxide material fabricated by Tanaka and sold as "high density, spherical" nickel hydroxide material was obtained. A compositional analysis showed that this commercial material, has the following composition:

$$Ni_{94}Co_3Zn_3. \quad (3)$$

Figure 1:
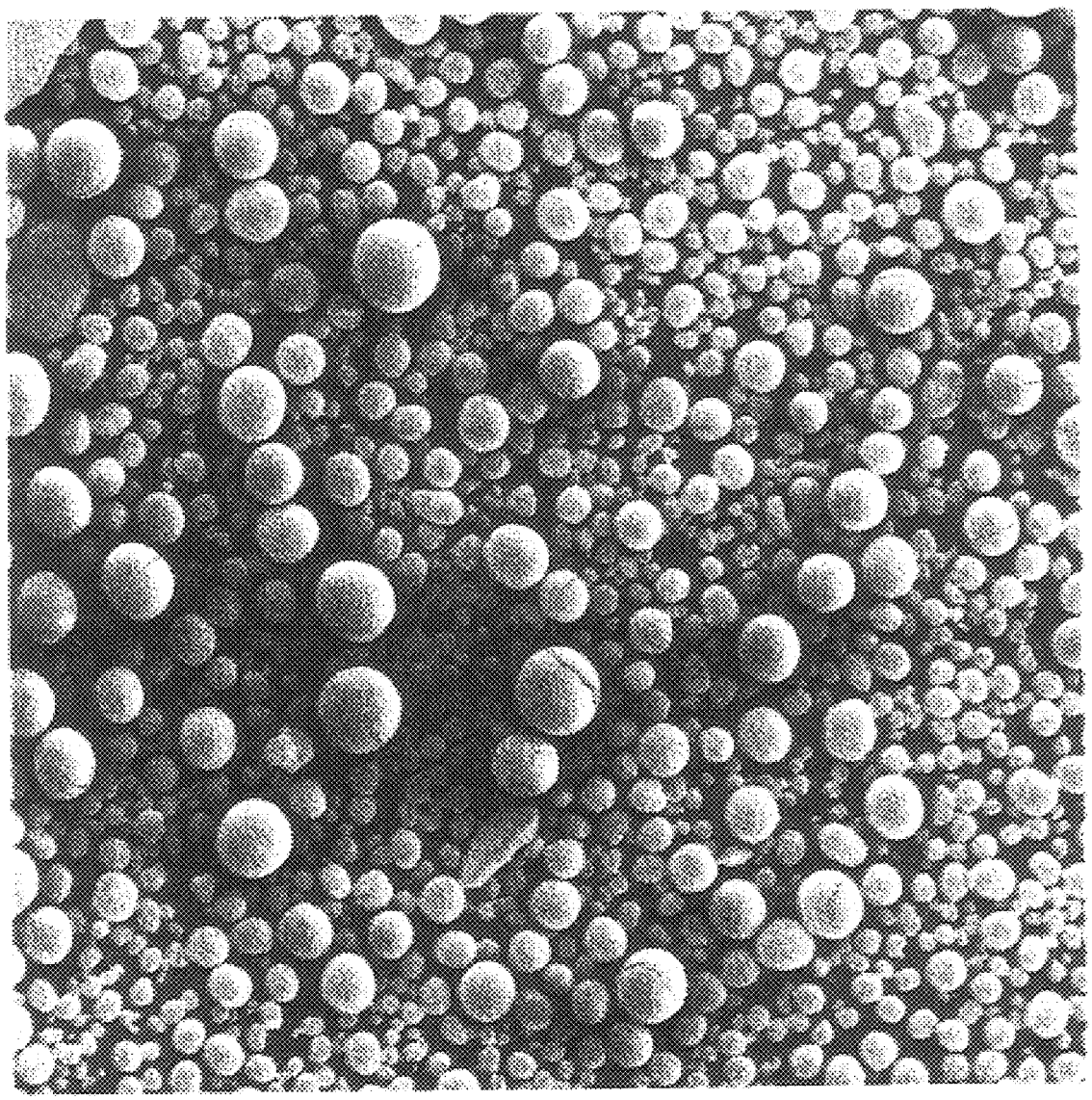
FIG. 1 is a scanning transmission electron micrograph of the nickel hydroxide materials of the present invention, taken at 480× magnification, showing the substantially spherical shape of the modified particles of positive electrode material illustrated therein.
Figure 2:
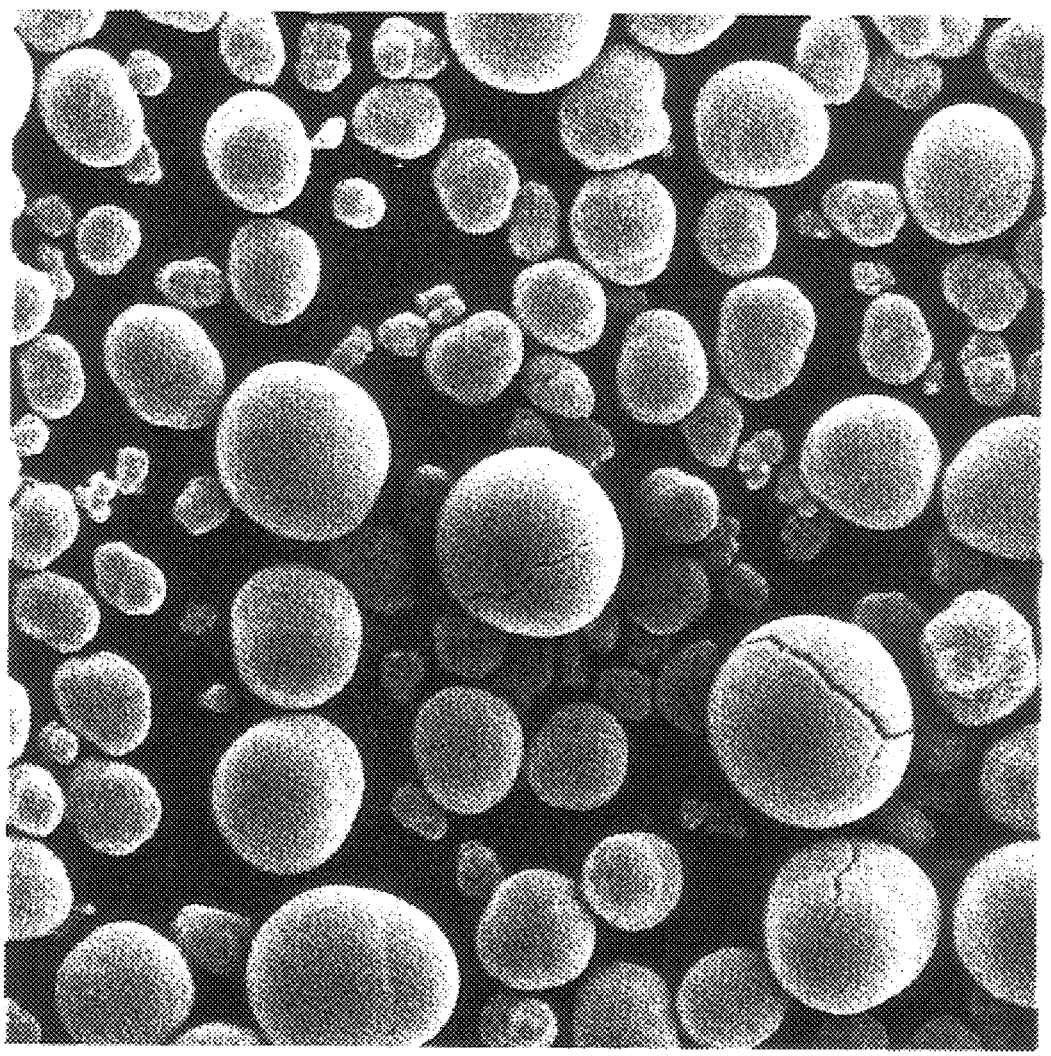
FIG. 2 is a scanning transmission electron micrograph of the positive electrode materials of the present invention, taken at 2000× magnification, showing the substantially spherical shape and size distribution of the modified nickel hydroxide particles illustrated therein.

The physical parameters of the prepared nickel hydroxide materials were determined using a scanning transmission electron microscope. FIGS. 1–2 are scanning transmission electron micrographs of the modified nickel hydroxide material of the present invention as describe in this example. The modified nickel hydroxide material of the present invention is illustrated therein as having high density, uniform spherical particles.

Other significant physical parameters for the modified nickel hydroxide materials of the instant invention and the conventional prior art materials are set forth in Table 1 below.

TABLE 1

|  | Prior Art Material | Modified Nickel Hydroxide (1) | Modified Nickel Hydroxide (2) |
|---|---|---|---|
| Formula | Ni$_{94}$Co$_3$Zn$_3$ | Ni$_{93}$Co$_5$Zn$_{0.5}$Mg$_{0.5}$Ca$_1$. | Ni$_{95}$Co$_3$Zn$_{0.5}$Mg$_{0.5}$Ca$_1$. |
| Particle size | 9 μm | 15 μm | 10 mm |
| Surface area | 12 m$^2$/g | 8 m$^2$/g | 12 m$^2$/g |
| Crystallite size <101> (from FWHM) | 103 Å | 85 Å | 90 Å |
| Tap density | 2.1 g/cc | 2.2 g/cc | 2.25 g/cc |

EXAMPLE 2

Slurries of the three formulations of nickel hydroxide material set forth in Table 1 above were formulated in a conventional manner. Such slurry was pasted onto expanded nickel foam, and dried to form positive electrodes. Loading for each of these electrodes is presented in Table 2. The electrodes formed from the modified nickel hydroxide materials of the instant invention were found to have much higher loading factors compared to conventional material. The higher loading of the modified nickel hydroxide materials of the present invention is the result of the uniformly spherical condition of the nickel hydroxide particles and their uniform size distribution (provides for a higher packing density).

Negative electrodes were fabricated as described in commonly assigned U.S. Pat. No. 5,536,591 (the disclosure of which is specifically incorporated herein by reference).

The negative metal hydride and the positive nickel hydroxide electrodes were used in flooded half cells for evaluation. These cells were fabricated by jelly winding positive and negative electrodes and inserting them into a standard C cell can. The positive end of the can was left open, and excess electrolyte added to the top of the can. The total electrode capacity was determined. The results of this evaluation are presented in Table 2.

The aforementioned positive and negative electrodes were also wound and placed in sealed, starved electrolyte C type cells as described in U.S. Pat. No. 5,536,591. The total electrode capacity for these cells was determined. The results are also presented in Table 2.

TABLE 2

|  | Prior Art | Invention | Invention |
|---|---|---|---|
| Formula | Ni$_{94}$Co$_3$Zn$_3$ | Ni$_{93}$Co$_5$Zn$_{0.5}$Mg$_{0.5}$Ca$_1$. | Ni$_{95}$Co$_3$Zn$_{0.5}$Mg$_{0.5}$Ca$_1$. |
| Loading | 2.7 g/cc | 2.8 g/cc | 3.0 g/cc |
| Half cell capacity | 184 mAh/g | 211 mAh/g | 195 mAh/g |
| Sealed cell total electrode capacity | 175 mAh/g 538 mAh/cc | 187 mAh/g 624 mAh/cc | 208 mAh/g 700 mAh/cc |

EXAMPLE 3

C type cells as prepared in Example 2 above, were subjected to capacity testing at different temperatures. The results are shown in FIG. 4.

The present invention is discussed above in terms of distinct features, such as particle size, additives, function of additives, and combinations. These discussions are in no way intended to limit the scope of the invention. Rather it is understood that these various features can be combined as desired in order to achieve maximum performance in variable applications. Further, it is obvious to those skilled in the art that the positive electrode materials of the present invention may be prepared by additional methods without departing from the spirit and scope of the present invention. The drawings, discussion, descriptions and examples of this specification are merely illustrative of particular embodiments of the invention and are not meant as limitations upon its practice. In particular, NiCd and NiMH cells are specifically discussed; however, the positive electrodes of the present invention can be used with any Ni based negative cell, such as NiZn and NiFe. Thus, it is the following claims, including all equivalents, that define the scope of the invention. As employed herein: the term "dopant" refers to very small concentrations of one or more elements in a given host matrix of nickel hydroxide material; the term "modifier" refers to 0.5% and higher concentrations of elements such as Co, Zn, Mg, Cu, Ca and Mn incorporated in the nickel hydroxide material; and the term "additive" refers to metallic nickel or graphite or other element added heterogeneously into the precipitate in the fabrication of nickel hydroxide material. Other undefined terms shall have the meaning commonly known by routineers ordinarily skilled in the electrochemical art to which the instant invention pertains.

What is claimed is:

1. A method of making a positive electrode material for use in an alkaline rechargeable electrochemical cell comprising:

combining a metal ion solution, $NH_4OH$, and NaOH in a reactor without forming a preamine complex, maintaining said reactor at a constant temperature of 20–100° C., agitating the combination at a rate of 400–1000 rpm, and controlling the pH of the agitating combination at 8–12.

2. The method of claim 1, where said metal ion solution is formulated to include Ni, and at least one modifier selected from the group consisting of Al, Bi, Ca, Co, Cr, Cu, Fe, In, La, rare earth elements, Mg, Mn, Ru, Sb, Sn, Ti, Ba, Si, Sr and Zn.

3. The method of claim 2, where said metal ion solution is a 1–7M metal sulfate solution.

4. The method of claim 2, where said $NH_4OH$ is a 5–20M solution.

5. The method of claim 2, further comprising combining calcium as calcium nitrate solution or calcium chloride solution to said reactor with a metal sulfate solution, $NH_4OH$ and NaOH.

6. The method of claim 2, further comprising combining a 2–15% calcium salt solution to said reactor with a metal sulfate solution, $NH_4OH$ and NaOH.

7. A method of producing nickel hydroxide material, said method comprising the steps of:

combining at least one metal ion solution which includes at least nickel ions, an ammonium hydroxide solution, and a sodium hydroxide solution in a single continuously stirred reactor without forming a preamine complex.

8. The method of claim 7, wherein said step of combining at least one metal ion solution comprises two or more metal ion solutions.

9. The method of claim 8, wherein said at least one metal ion solution is selected from the group consisting of sulfates, nitrates, chlorides and mixtures thereof.

10. The method of claim 8, wherein said two or more metal ion solutions include one metal ion solution which contains at least nickel ions and a second metal ion solution which contains at least calcium ions.

11. The method of claim 10, wherein said metal ion solution which Contains at least nickel ions additionally includes one or more of cobalt, magnesium or zinc ions.

12. The method of claim 11, wherein said metal ion solution further includes one or more metal ions selected from the group consisting of Al, Bi, Cr, Cu, Fe, In, La, rare earth elements, Mn, Ru, Sb, Sn, Ba, Si, Sr and Ti.

13. The method of claim 7, wherein said at least one metal ion solution is selected from the group consisting of sulfates, nitrates, chlorides and mixtures thereof.

14. The method of claim 7, wherein said at least one metal ion solution which includes at least nickel ions additionally includes one or more of cobalt, magnesium or zinc ions.

15. The method of claim 14, wherein said at least one metal ion solution is a metal sulfate solution.

16. The method of claim 7, wherein the precipitated nickel hydroxide has a base metal formula of NiCoZnMgCa.

17. The method of claim 7, wherein said metal ion solution further includes one or more metal ions selected from the group consisting of Al, Bi, Ca, Cr, Cu, Fe, In, La, rare earth elements, Mg, Mn, Ru, Sb, Sn, Ba, Zn, Si, Sr and Ti.

18. The method of claim 7, wherein the method further includes the step of controlling the flow rates of said metal ion solutions, said ammonium hydroxide solution, and said sodium hydroxide solution, the reaction temperature, the stirring rate of said continuously stirred tank reactor, and the pH of the reaction such that the formed nickel hydroxide material contains 10–18 micron diameter, spherical nickel hydroxide particles, and wherein the nickel hydroxide material has a tap density of at least 1.9 grams per cubic centimeter.

19. A method of producing nickel hydroxide material, said method comprising the steps of:

simultaneously combining at least one metal ion solution which includes at least nickel ions, an ammonium hydroxide solution, and a sodium hydroxide solution in a single continuously stirred reactor without forming a preamine complex; and precipitating positive active material in a continuous manner.

* * * * *